(12) United States Patent
Ikeda et al.

(10) Patent No.: US 10,020,523 B2
(45) Date of Patent: Jul. 10, 2018

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventors: Nobuhisa Ikeda, Kanagawa (JP); Tetsuya Aoki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/561,179

(22) PCT Filed: Mar. 27, 2015

(86) PCT No.: PCT/JP2015/059712
§ 371 (c)(1),
(2) Date: Sep. 25, 2017

(87) PCT Pub. No.: WO2016/157320
PCT Pub. Date: Oct. 6, 2016

(65) Prior Publication Data
US 2018/0048003 A1 Feb. 15, 2018

(51) Int. Cl.
*H01M 8/04119* (2016.01)
*H01M 8/04492* (2016.01)
(Continued)

(52) U.S. Cl.
CPC ... *H01M 8/04179* (2013.01); *H01M 8/04067* (2013.01); *H01M 8/04529* (2013.01);
(Continued)

(58) Field of Classification Search
CPC ......... H01M 8/04179; H01M 8/04753; H01M 8/04708; H01M 8/04604; H01M 8/04529
See application file for complete search history.

(56) References Cited

U.S. PATENT DOCUMENTS

2006/0263653 A1* 11/2006 Sinha ................ H01M 8/04126
429/413
2011/0003215 A1 1/2011 Tanaka et al.
(Continued)

FOREIGN PATENT DOCUMENTS

CN 101536229 A 9/2009
CN 103403939 A 11/2013
(Continued)

*Primary Examiner* — Maria Laios
(74) *Attorney, Agent, or Firm* — Foley & Lardner LLP

(57) ABSTRACT

A fuel cell system includes a fuel supply unit that supplies a fuel to electrolyte membrane of fuel cell, an oxidant supply unit that supplies an oxidant to the electrolyte membrane, and an electricity generation control unit that controls electricity generation by the fuel cell by controlling supply of the oxidant by the oxidant supply unit and supply of the fuel by the fuel supply unit. the fuel cell system includes a wet/dry state detection unit configured to detect a wet/dry state of the electrolyte membrane, a flow rate adjustment unit configured to adjust a flow rate of the fuel supplied to the fuel cell by the fuel supply unit; and a temperature adjustment unit configured to adjust a temperature of the oxidant supplied to the fuel cell by the oxidant supply unit. when reducing an amount of water in the electrolyte membrane in accordance with a signal output from the wet/dry state detection unit, the electricity generation control unit is configured to reduce the flow rate of the fuel, and increase the temperature of the oxidant in accordance with the signal from the wet/dry state detection unit, compared with when increasing the amount of water in the electrolyte membrane.

12 Claims, 20 Drawing Sheets

(51) Int. Cl.
*H01M 8/04701* (2016.01)
*H01M 8/04858* (2016.01)
*H01M 8/04007* (2016.01)
*H01M 8/04537* (2016.01)
*H01M 8/04746* (2016.01)

(52) U.S. Cl.
CPC ... *H01M 8/04604* (2013.01); *H01M 8/04708* (2013.01); *H01M 8/04753* (2013.01); *H01M 8/04858* (2013.01); *H01M 2220/20* (2013.01)

(56) References Cited

U.S. PATENT DOCUMENTS

| | | |
|---|---|---|
| 2011/0200896 A1 | 8/2011 | Hasegawa et al. |
| 2013/0052551 A1 | 2/2013 | Ishikawa |
| 2013/0330646 A1 | 12/2013 | Aoki |
| 2015/0276888 A1 | 10/2015 | Sakai |
| 2016/0028095 A1 | 1/2016 | Sakai |

FOREIGN PATENT DOCUMENTS

| | | |
|---|---|---|
| JP | 2004-165058 A | 6/2004 |
| JP | 2005-93111 A | 4/2005 |
| JP | 2009-187689 A | 8/2009 |
| JP | 2009-245826 A | 10/2009 |
| JP | 2011-14429 A | 1/2011 |
| JP | 2011-28937 A | 2/2011 |
| JP | 2012-109182 A | 6/2012 |
| JP | 5104950 B2 | 12/2012 |
| JP | 2014-44846 A | 3/2014 |
| WO | WO 2008/056617 A1 | 5/2008 |
| WO | WO 2012/114432 A1 | 8/2012 |
| WO | WO 2014/057868 A1 | 4/2014 |
| WO | WO 2014/141752 A1 | 9/2014 |

\* cited by examiner

FUEL CELL SYSTEM AND CONTROL METHOD FOR FUEL CELL SYSTEM

TECHNICAL FIELD

The present invention relates to a fuel cell system and a fuel cell system control method that adjust the flow rate of a fuel supplied to fuel cells and the temperature of the fuel cells.

BACKGROUND ART

Japanese Patent No. 5104950 discloses a fuel cell system that, when a dry operation for reducing a wetness degree (water content) of electrolyte membrane has ended, maintains a wet/dry state of the electrolyte membrane by increasing and reducing the flow rate of a fuel supplied to the electrolyte membrane.

SUMMARY OF INVENTION

In such a fuel cell system, an oxidant gas supplied to fuel cells is humidified by water vapor that accompanies electricity generation, and thus the water vapor is discharged from the fuel cells together with the oxidant gas that has not been used. Therefore, when the dry operation is executed, the temperature of the fuel cells is increased so as to increase the amount of water vapor that can be retained in the oxidant gas.

However, as the amount of water vapor that can be retained in a fuel gas also increases along with the increase in the temperature of the fuel cells, the amount of water vapor that is transmitted from the oxidant gas through the electrolyte membrane and mixed into the fuel gas also increases. With the increase in water vapor in the fuel gas, the wetness degree of the electrolyte membrane becomes less likely to decrease due to water in the fuel gas. This gives rise to the problem that a period of time required for the dry operation is extended.

The present invention has been made in view of the foregoing problem, and aims to provide a fuel cell system and a fuel cell system control method that efficiently control a wet/dry state of fuel cells.

According to one aspect of the present invention, a fuel cell system includes a fuel supply unit that supplies a fuel to electrolyte membrane of fuel cell, an oxidant supply unit that supplies an oxidant to the electrolyte membrane, and an electricity generation control unit that controls electricity generation by the fuel cell by controlling supply of the oxidant by the oxidant supply unit and supply of the fuel by the fuel supply unit. the fuel cell system includes a wet/dry state detection unit configured to detect a wet/dry state of the electrolyte membrane, a flow rate adjustment unit configured to adjust a flow rate of the fuel supplied to the fuel cell by the fuel supply unit; and a temperature adjustment unit configured to adjust a temperature of the oxidant supplied to the fuel cell by the oxidant supply unit. when reducing an amount of water in the electrolyte membrane in accordance with a signal output from the wet/dry state detection unit, the electricity generation control unit is configured to reduce the flow rate of the fuel, and increase the temperature of the oxidant in accordance with the signal from the wet/dry state detection unit, compared with when increasing the amount of water in the electrolyte membrane.

DESCRIPTION OF EMBODIMENTS

The following describes embodiments of the present invention with reference to the attached drawings.

First Embodiment

A fuel cell is composed of an anode electrode serving as a fuel electrode, a cathode electrode serving as an oxidant electrode, and an electrolyte membrane interposed between the anode electrode and the cathode electrode. An anode gas containing hydrogen is supplied as a fuel to the anode electrode of the fuel cell. A cathode gas containing oxygen is supplied as an oxidant to the cathode electrode of the fuel cell.

The fuel cell generates electric power using the anode gas containing hydrogen and the cathode gas containing oxygen. The following electrode reactions progress in the anode electrode and the cathode electrode.

$$\text{Anode electrode: } 2H_2 \rightarrow 4H^+ + 4e^- \quad (1)$$

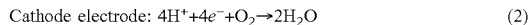

$$\text{Cathode electrode: } 4H^+ + 4e^- + O_2 \rightarrow 2H_2O \quad (2)$$

Due to these electrode reactions (1) and (2), the fuel cell generates an electromotive force of approximately one volt (V).

Figure 1:
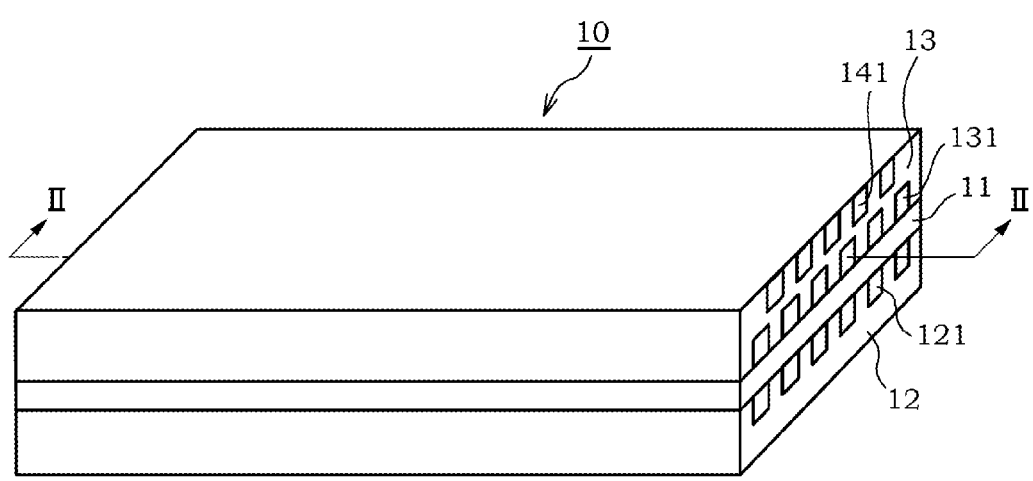
FIG. 1 is a perspective view showing a configuration of a fuel cell according to an embodiment of the present invention.
Figure 2:
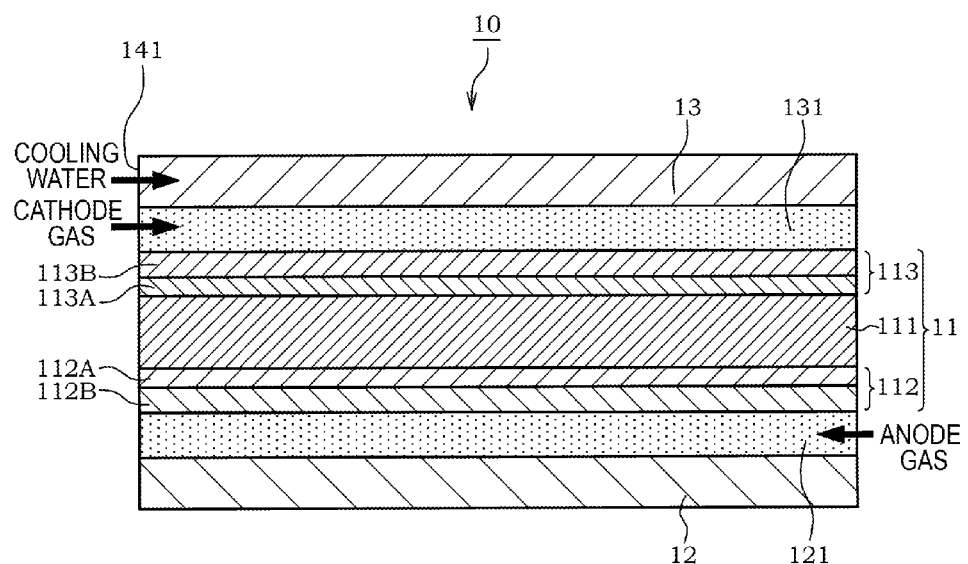
FIG. 2 is a cross-sectional view of the fuel cell shown in FIG. 1 taken along the line II-II.

FIGS. 1 and 2 illustrate a configuration of a fuel cell 10 according to one embodiment of the present invention. FIG. 1 is a perspective view of the fuel cell 10. FIG. 2 is a cross-sectional view of the fuel cell 10 shown in FIG. 1 taken along the line II-II.

As shown in FIGS. 1 and 2, the fuel cell 10 includes a membrane electrode assembly (MEA) 11, as well as an anode separator 12 and a cathode separator 13 that are arranged with the MEA 11 interposed therebetween.

The MEA 11 is composed of an electrolyte membrane 111, an anode electrode 112, and a cathode electrode 113. In the MEA 11, the anode electrode 112 is arranged on one surface of the electrolyte membrane 111, whereas the cathode electrode 113 is arranged on the other surface of the electrolyte membrane 111.

The electrolyte membrane 111 is a proton-conducting ion-exchange membrane made of fluororesin. The electrolyte membrane 111 demonstrates favorable electrical conductivity at an appropriate degree of wetness. Herein, the wetness degree of the electrolyte membrane 111 is equivalent to an amount of water contained (water content) in the electrolyte membrane 111. The higher the degree of wetness, the larger the amount of water (moisture) in the electrolyte membrane 111, and the wetter the electrolyte membrane 111. On the other hand, the lower the degree of wetness, the smaller the amount of water (moisture) in the electrolyte membrane 111.

The anode electrode 112 includes a catalyst layer 112A and a gas diffusion layer 112B. The catalyst layer 112A is a member made of platinum or carbon black particles on which platinum and the like are supported, and is in contact with the electrolyte membrane 111. The gas diffusion layer 112B is arranged at the outer side of the catalyst layer 112A. The gas diffusion layer 112B is a member made of a carbon cloth with gas diffusion properties and electrical conductivity, and is in contact with the catalyst layer 112A and the anode separator 12.

Similarly to the anode electrode 112, the cathode electrode 113 includes a catalyst layer 113A and a gas diffusion layer 113B. The catalyst layer 113A is interposed between the electrolyte membrane 111 and the gas diffusion layer 113B. The gas diffusion layer 113B is interposed between the catalyst layer 113A and the cathode separator 13.

The anode separator 12 is arranged at the outer side of the gas diffusion layer 112B. The anode separator 12 includes a plurality of anode gas flow passages 121 intended to supply an anode gas to the anode electrode 112. The anode gas flow passages 121 are formed as groove-like passages. That is, the anode gas flow passages 121 constitute fuel flow passages that allow the fuel to flow therethrough while facing the other surface of the electrolyte membrane 111.

The cathode separator 13 is arranged at the outer side of the gas diffusion layer 113B. The cathode separator 13 includes a plurality of cathode gas flow passages 131 intended to supply a cathode gas to the cathode electrode 113. The cathode gas flow passages 131 are formed as groove-like passages. That is, the cathode gas flow passages 131 constitute oxidant flow passages that allow the oxidant to flow therethrough while facing one surface of the electrolyte membrane 111.

The cathode separator 13 also includes a plurality of cooling water flow passages 141 intended to supply cooling water for cooling the fuel cell 10. The cooling water flow passages 141 are formed as groove-like passages. That is, the cooling water flow passages 141 constitute refrigerant flow passages that allow a refrigerant for cooling the fuel cell 10 to flow therethrough.

As shown in FIG. 2, the cathode separator 13 is configured in such a manner that a flow direction of the cooling water flowing in the cooling water flow passages 141 is the same as a flow direction of the cathode gas flowing in the cathode gas flow passages 131. Note that the cathode separator 13 may be configured in such a manner that these flow directions are opposite to each other. Furthermore, the cathode separator 13 may be configured in such a manner that these flow directions have predetermined angles.

The anode separator 12 and the cathode separator 13 are configured in such a manner that a flow direction of the anode gas flowing in the anode gas flow passages 121 is opposite to the flow direction of the cathode gas flowing in the flow cathode gas flow passages 131. Furthermore, the anode separator 12 and the cathode separator 13 may be configured in such a manner that these flow directions have predetermined angles.

When the foregoing fuel cell 10 is used as a power supply for an automobile, several hundred fuel cells 10 are laminated to constitute a fuel cell stack 1, because an electric motor requires a large amount of electric power. A fuel cell system 100 that supplies the anode gas and the cathode gas to the fuel cell stack 1 is configured, and electric power for driving a vehicle is extracted therefrom.

Figure 3:
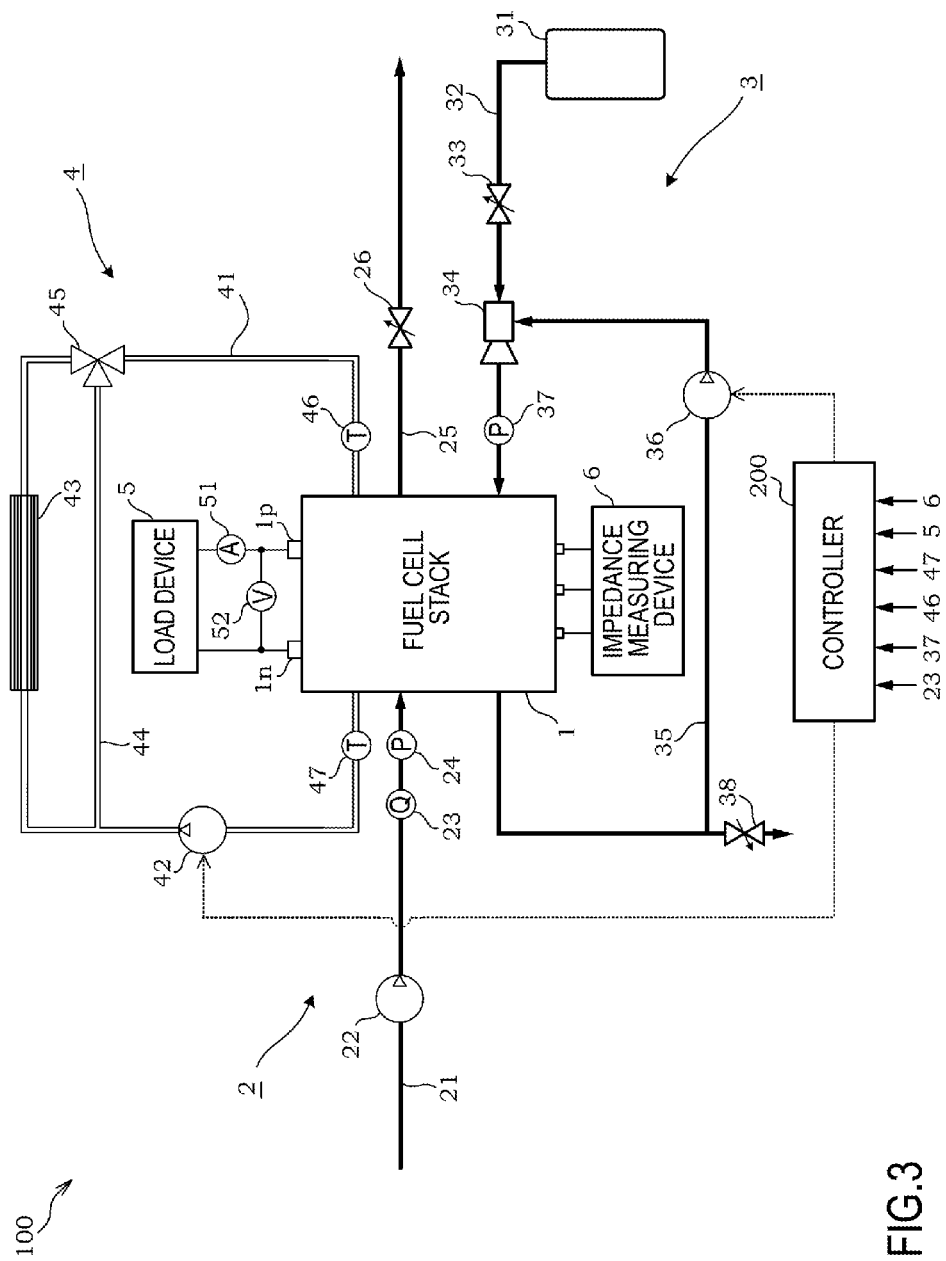
FIG. 3 shows a configuration of a fuel cell system according to the present embodiment.

FIG. 3 is a configuration diagram showing an example of the fuel cell system 100 according to the first embodiment of the present invention.

The fuel cell system 100 constitutes a power supply system that causes the fuel cells to generate electric power in accordance with an electric load by supplying the anode gas and the cathode gas, which are necessary for electricity generation, to the fuel cells from the outside.

The fuel cell system 100 includes the fuel cell stack 1, a cathode gas supplying/discharging device 2, an anode gas supplying/discharging device 3, a stack cooling device 4, a load device 5, an impedance measuring device 6, and a controller 200.

As stated earlier, the fuel cell stack 1 is represented by a laminated type battery (layer cell), that is, a plurality of laminated fuel cells 10. The fuel cell stack 1 is connected to and supplies electric power to the load device 5. The fuel cell stack 1 generates a DC voltage of, for example, several hundred volts (V).

The cathode gas supplying/discharging device 2 supplies the cathode gas to the fuel cell stack 1, and discharges a cathode off-gas discharged from the fuel cell stack 1 to the open air. That is, the cathode gas supplying/discharging device 2 constitutes oxidant supply unit for supplying the oxidant to the electrolyte membrane 111 of the fuel cell 10.

The cathode gas supplying/discharging device 2 includes a cathode gas supply passage 21, a compressor 22, a flow rate sensor 23, a pressure sensor 24, a cathode gas discharge passage 25, and a cathode pressure control valve 26.

The cathode gas is supplied to the fuel cell stack 1 through the cathode gas supply passage 21. The cathode gas supply passage 21 is open at one end, and is connected to a cathode gas inlet hole of the fuel cell stack 1 at the other end.

The compressor 22 is provided in the cathode gas supply passage 21. The compressor 22 takes in air containing oxygen from the open end of the cathode gas supply passage 21, and supplies the air as the cathode gas to the fuel cell stack 1. The rotation speed of the compressor 22 is controlled by the controller 200.

The flow rate sensor 23 is provided in the cathode gas supply passage 21 so as to be located between the compressor 22 and the fuel cell stack 1. The flow rate sensor 23 detects the flow rate of the cathode gas supplied to the fuel cell stack 1. Hereinafter, the flow rate of the cathode gas supplied to the fuel cell stack 1 will simply be referred to as the "cathode gas flow rate." The flow rate sensor 23 outputs a signal indicating the detected cathode gas flow rate to the controller 200.

The pressure sensor 24 is provided in the cathode gas supply passage 21 so as to be located between the compressor 22 and the fuel cell stack 1. The pressure sensor 24 detects the pressure of the cathode gas supplied to the fuel cell stack 1. Hereinafter, the pressure of the cathode gas supplied to the fuel cell stack 1 will simply be referred to as the "cathode gas pressure." The pressure sensor 24 outputs a signal indicating the detected cathode gas pressure to the controller 200.

The cathode off-gas is discharged from the fuel cell stack 1 through the cathode gas discharge passage 25. The cathode gas discharge passage 25 is connected to a cathode gas outlet hole of the fuel cell stack 1 at one end, and is open at the other end.

The cathode pressure control valve 26 is provided in the cathode gas discharge passage 25. The cathode pressure control valve 26 is, for example, an electromagnetic valve that is capable of changing its opening degree in a stepwise manner. The cathode pressure control valve 26 opens and closes under control of the controller 200. Through this open/close control, the cathode gas pressure is adjusted to match a desired pressure. The cathode pressure control valve 26 opens to a greater extent as its opening degree increases. The cathode pressure control valve 26 closes to a greater extent as its opening degree decreases.

The anode gas supplying/discharging device 3 supplies the anode gas to the fuel cell stack 1, and circulates an anode off-gas, which is discharged from the fuel cell stack 1, back to the fuel cell stack 1. That is, the anode gas supplying/discharging device 3 constitutes fuel supply unit for supplying the fuel to the electrolyte membrane 111 of the fuel cell 10.

The anode gas supplying/discharging device 3 includes a high-pressure tank 31, an anode gas supply passage 32, an anode pressure control valve 33, an ejector 34, an anode gas circulation passage 35, an anode circulation pump 36, a pressure sensor 37, and a purge valve 38.

The high-pressure tank 31 reserves the anode gas to be supplied to the fuel cell stack 1 while maintaining the anode gas in a high-pressure state.

The anode gas reserved in the high-pressure tank 31 is supplied to the fuel cell stack 1 through the anode gas supply passage 32. The anode gas supply passage 32 is connected to the high-pressure tank 31 at one end, and is connected to the other an anode gas inlet hole of the fuel cell stack 1 at the other end.

The anode pressure control valve 33 is provided in the anode gas supply passage 32 so as to be located between the high-pressure tank 31 and the ejector 34. The anode pressure control valve 33 is, for example, an electromagnetic valve that is capable of changing its opening degree in a stepwise manner. The anode pressure control valve 33 opens and closes under control of the controller 200. Through this open/close control, the pressure of the anode gas supplied to the fuel cell stack 1 is adjusted.

The ejector 34 is provided in the anode gas supply passage 32 so as to be located between the anode pressure control valve 33 and the fuel cell stack 1. The ejector 34 is a mechanical pump located in a section where the anode gas circulation passage 35 merges into the anode gas supply passage 32. Providing the ejector 34 in the anode gas supply passage 32 enables the circulation of the anode off-gas to the fuel cell stack 1 with simple configurations.

The ejector 34 suctions the anode off-gas from the fuel cell stack 1 by generating a negative pressure through acceleration of the flow speed of the anode gas supplied from the anode pressure control valve 33. The ejector 34 ejects the suctioned anode off-gas, together with the anode gas supplied from the anode pressure control valve 33, to the fuel cell stack 1.

The ejector 34 is composed of, for example, a conical nozzle with an opening that narrows in a direction from the anode pressure control valve 33 to the fuel cell stack 1, and a diffuser with a suction port that suctions the anode off-gas from the fuel cell stack 1. Although the ejector 34 is used in the present embodiment, the anode gas circulation passage 35 may simply merge directly into the anode gas supply passage 32.

The anode gas circulation passage 35 circulates the anode off-gas from the fuel cell stack 1 to the anode gas supply passage 32. The anode gas circulation passage 35 is connected to an anode gas outlet hole of the fuel cell stack 1 at one end, and is connected to the suction port of the ejector 34 at the other end.

The anode circulation pump 36 is provided in the anode gas circulation passage 35. The anode circulation pump 36 circulates the anode off-gas to the fuel cell stack 1 via the ejector 34. The rotation speed of the anode circulation pump 36 is controlled by the controller 200. Through this control, the flow rate of the anode gas circulated to the fuel cell stack 1 is adjusted. Hereinafter, the flow rate of the anode gas circulated to the fuel cell stack 1 will simply be referred to as the "anode gas circulation flow rate."

The purge valve 38 is provided in an anode gas discharge passage that branches from the anode gas circulation passage 35. The purge valve 38 discharges impurities contained in the anode off-gas to the outside. The impurities include nitrogen gas in the air that has been transmitted from the cathode gas flow passages 131 through the electrolyte membranes 111, generated water accompanying electricity generation, and so forth. The opening degree of the purge valve 38 is controlled by the controller 200.

Although not illustrated, the anode gas discharge passage merges into the cathode gas discharge passage 25 in a section located downstream relative to the cathode pressure control valve 26. Accordingly, the anode off-gas discharged from the purge valve 38 is mixed with the cathode off-gas inside the cathode gas discharge passage 25, and the concentration of hydrogen in the mixed gas is set to a value that is equal to or smaller than an allowable discharge concentration.

The stack cooling device 4 adjusts the fuel cell stack 1 to a temperature that is appropriate for electricity generation by supplying the refrigerant for cooling the fuel cell 10 to the fuel cell stack 1. In the present embodiment, cooling water is used as the refrigerant.

The stack cooling device 4 also functions as a gas temperature adjustment device that increases the temperature of the cathode gas passing through the cathode gas flow passages 131 so as to increase the amount of water vapor in the cathode gas discharged from the fuel cell stack 1. That is, the stack cooling device 4 constitutes temperature adjustment unit for adjusting the temperature of the oxidant supplied to the fuel cell 10.

The stack cooling device 4 includes a cooling water circulation passage 41, a cooling water pump 42, a radiator 43, a bypass passage 44, a three-way valve 45, an inlet water temperature sensor 46, and an outlet water temperature sensor 47.

The cooling water circulation passage 41 circulates the cooling water to the fuel cell stack 1. The cooling water circulation passage 41 is connected to a cooling water inlet hole of the fuel cell stack 1 at one end, and is connected to a cooling water outlet hole of the fuel cell stack 1 at the other end.

The cooling water pump 42 is provided in the cooling water circulation passage 41. The cooling water pump 42 supplies the cooling water to the fuel cell stack 1 via the radiator 43. The rotation speed of the cooling water pump 42 is controlled by the controller 200.

For example, when the temperature of the fuel cell stack 1 is higher than the temperature of the cooling water, increasing the rotation speed of the cooling water pump 42 will increase the amount of heat dissipated by the fuel cell 10 into the cooling water, thereby reducing the temperature of the fuel cell stack 1. On the other hand, reducing the rotation speed of the cooling water pump 42 will reduce the heat exchange rate, thereby increasing the temperature of the fuel cell stack 1.

The radiator 43 is provided in the cooling water circulation passage 41 so as to be located downstream relative to the cooling water pump 42. Using a fan, the radiator 43 cools the cooling water that has been warmed by the fuel cell stack 1.

The bypass passage 44 bypasses the radiator 43, and circulates the cooling water discharged from the fuel cell stack 1 directly back to the fuel cell stack 1. One end of the bypass passage 44 is connected to the cooling water circulation passage 41 in a section between the cooling water pump 42 and the radiator 43. The other end of the bypass passage 44 is connected to one end of the three-way valve 45. Note that the bypass passage 44 may be provided with a heater that warms up the fuel cell stack 1 when the fuel cell system 100 is activated at or below a freezing point.

The three-way valve 45 adjusts the temperature of the cooling water supplied to the fuel cell stack 1. In the present embodiment, the three-way valve 45 is realized by a thermostat. The three-way valve 45 is provided in the cooling water circulation passage 41 in a section which is located between the radiator 43 and the cooling water inlet hole of the fuel cell stack 1 and in which the bypass passage 44 merges into the cooling water circulation passage 41.

When the temperature of the cooling water is equal to or lower than a predetermined valve-opening temperature, the three-way valve 45 blocks the passage of cooling water from the radiator 43 to the fuel cell stack 1, and supplies only the cooling water that has passed through the bypass passage 44 to the fuel cell stack 1. In this way, the cooling water having a higher temperature than the cooling water that has passed through the radiator 43 flows into the fuel cell stack 1.

On the other hand, once the temperature of the cooling water has exceeded the aforementioned valve-opening temperature, an opening of the cooling water passage from the radiator 43 to the fuel cell stack 1 starts to increase gradually. Accordingly, the three-way valve 45 mixes the cooling water that has passed through the bypass passage 44 with the cooling water that has passed through the radiator 43, and supplies the mixed cooling water to the fuel cell stack 1. As a result, the cooling water having a lower temperature than the cooling water that has passed through the bypass passage 44 flows into the fuel cell stack 1.

The inlet water temperature sensor 46 and the outlet water temperature sensor 47 detect the temperature of the cooling water. The temperature of the cooling water is used as the temperature of the fuel cell stack 1 and the temperature of the cathode gas. Hereinafter, the temperature of the fuel cell stack 1 will also be referred to as the "stack temperature."

The inlet water temperature sensor 46 is provided in the cooling water circulation passage 41 so as to be located in the vicinity of the cooling water inlet hole provided in the fuel cell stack 1. The inlet water temperature sensor 46 detects the temperature of the cooling water flowing into the cooling water inlet hole of the fuel cell stack 1. Hereinafter, the temperature of the cooling water flowing into the cooling water inlet hole of the fuel cell stack 1 will be referred to as the "stack inlet water temperature." The inlet water temperature sensor 46 outputs a signal indicating the detected stack inlet water temperature to the controller 200.

The outlet water temperature sensor 47 is provided in the cooling water circulation passage 41 so as to be located in the vicinity of the cooling water outlet hole provided in the fuel cell stack 1. The outlet water temperature sensor 47 detects the temperature of the cooling water discharged from the fuel cell stack 1. Hereinafter, the temperature of the cooling water discharged from the fuel cell stack 1 will be referred to as the "stack outlet water temperature." The outlet water temperature sensor 47 outputs a signal indicating the detected stack outlet water temperature to the controller 200.

The load device 5 is driven by generated electric power that has been supplied thereto from the fuel cell stack 1. The load device 5 is composed of, for example, the electric motor that drives the vehicle, a part of auxiliary machines that assist with electricity generation by the fuel cell stack 1, a control unit that controls the electric motor, and so forth. The auxiliary machines for the fuel cell stack 1 include, for example, the compressor 22, the anode circulation pump 36, the cooling water pump 42, and so forth.

Alternatively, the load device 5 may include a DC/DC converter that is connected to an electric motor inverter at one side and to a battery at the other side. In this case, a part of the auxiliary machines may be connected to a power supply line between the DC/DC converter and the battery. Note that the control unit that controls the load device 5 outputs, to the controller 200, electric power that the load device 5 requires from the fuel cell stack 1. For example, the larger the amount of depression of an accelerator pedal installed in the vehicle, the higher the electric power required by the load device 5.

A current sensor 51 and a voltage sensor 52 are arranged between the load device 5 and the fuel cell stack 1.

The current sensor 51 is connected to a power supply line between a positive electrode terminal 1p of the fuel cell stack 1 and the load device 5. The current sensor 51 detects a current output from the fuel cell stack 1 to the load device 5 as output electric power of the fuel cell stack 1. Hereinafter, the current output from the fuel cell stack 1 to the load device 5 will be referred to as the "stack output current." The current sensor 51 outputs a signal indicating the detected stack output current to the controller 200.

The voltage sensor 52 is connected between the positive electrode terminal 1p and a negative electrode terminal 1n of the fuel cell stack 1. The voltage sensor 52 detects an inter-terminal voltage, which is a voltage between the positive electrode terminal 1p and the negative electrode terminal 1n of the fuel cell stack 1. Hereinafter, the inter-terminal voltage of the fuel cell stack 1 will be referred to as the "stack output voltage." The voltage sensor 52 outputs a signal indicating the detected stack output voltage to the controller 200.

The impedance measuring device 6 detects a wet/dry state of the electrolyte membranes 111. The impedance measuring device 6 measures an internal impedance of the fuel cell stack 1, which correlates with the wet/dry state of the electrolyte membranes 111.

In general, the lower the water content of the electrolyte membranes, that is, the dryer the electrolyte membranes, the larger the electrical resistance component of the internal impedance. On the other hand, the higher the water content of the electrolyte membranes, that is, the wetter the electrolyte membranes, the smaller the electrical resistance component of the internal impedance. In view of this, the internal impedance of the fuel cell stack 1 is used as a parameter indicating the wet/dry state of the electrolyte membranes 111.

The fuel cell stack 1 is provided with a positive electrode tab and a negative electrode tab that are connected in series to the positive electrode terminal 1p and the negative electrode terminal 1n respectively. The impedance measuring device 6 is connected to both the positive electrode tab and the negative electrode tab. The impedance measuring device 6 supplies, to the positive electrode terminal 1p an alternating current having a frequency that is appropriate for detection of the electrical resistance of the electrolyte membranes 111. Hereinafter, the frequency that is appropriate for detection of the electrical resistance of the electrolyte membranes will be referred to as the "electrolyte membrane response frequency." The impedance measuring device 6 detects an AC voltage that is generated between the positive electrode terminals 1p and 1n due to the alternating current having the electrolyte membrane response frequency, and calculates the internal impedance by dividing the amplitude of the detected AC voltage by the amplitude of the alternating current supplied to the positive electrode terminal 1p.

In the present embodiment, among the laminated fuel cells 10 in the fuel cell stack 1, a fuel cell 10 located in the middle is provided with an intermediate tab, and the impedance measuring device 6 is connected to the intermediate tab as well. The intermediate tab is grounded in the impedance measuring device 6.

The impedance measuring device 6 supplies the alternating current having the electrolyte membrane response frequency to both of the positive electrode terminal 1p and the negative electrode terminal 1n. The impedance measuring device 6 calculates the internal impedance at the positive electrode side by dividing the amplitude of the AC voltage between the positive electrode terminal 1p and the intermediate tab by the amplitude of the alternating current supplied to the positive electrode terminal 1p. The impedance measuring device 6 also calculates the internal impedance at the negative electrode side by dividing the amplitude of the AC voltage between the positive electrode terminal 1n and the intermediate tab by the amplitude of the alternating current supplied to the positive electrode terminal 1n.

Hereinafter, the internal impedance that is measured on the basis of the electrolyte membrane response frequency will be referred to as the high frequency resistance (HFR). The impedance measuring device 6 outputs the calculated HFR to the controller 200.

The controller 200 is composed of a microcomputer provided with a central processing unit (CPU), a read-only memory (ROM), a random-access memory (RAM), and an input/output (I/O) interface.

The controller 200 receives, as inputs, signals that are output from the flow rate sensor 23, the pressure sensor 24, the pressure sensor 37, the inlet water temperature sensor 46, the outlet water temperature sensor 47, the current sensor 51, the voltage sensor 52, and the impedance measuring device 6, as well as the electric power required by the load device 5. These signals are used as parameters related to the operating condition of the fuel cell system 100.

In accordance with the operating condition of the fuel cell system 100, the controller 200 controls the flow rate and the pressure of the cathode gas by controlling the compressor 22 and the cathode pressure control valve 26, and controls the flow rate and the pressure of the anode gas by controlling the anode pressure control valve 33 and the anode circulation pump 36. Furthermore, in accordance with the operating condition of the fuel cell system 100, the controller 200 controls the temperature of the fuel cells 10 in the fuel cell stack 1 and the temperature of the cathode gas by controlling the cooling water pump 42 and the three-way valve 45.

For example, the controller 200 computes a target flow rate and a target pressure of the cathode gas, as well as a target flow rate and a target pressure of the anode gas, on the basis of the electric power required by the load device 5. The controller 200 controls the rotation speed of the compressor 22 and the opening degree of the cathode pressure control valve 26 on the basis of the target flow rate and the target pressure of the cathode gas. The controller 200 also controls the rotation speed of the anode circulation pump 36 and the opening degree of the anode pressure control valve 33 on the basis of the target flow rate and the target pressure of the anode gas.

Furthermore, the controller 200 computes a target stack temperature for maintaining the electricity generation performance of the fuel cell stack 1, and controls the rotation speed of the cooling water pump 42 on the basis of the target stack temperature. For example, the controller 200 makes the rotation speed of the cooling water pump 42 higher when the stack temperature is higher than the target stack temperature than when the stack temperature is lower than the target stack temperature.

In such a fuel cell system 100, the electricity generation performance worsens if the wetness degree (water content) of each electrolyte membrane 111 becomes too high or too low. In order for the fuel cell stack 1 to efficiently generate electric power, it is important to maintain the electrolyte membranes 111 of the fuel cell stack 1 at an appropriate degree of wetness. To this end, the controller 200 controls the wet/dry state of the fuel cell stack 1 so as to place the fuel cell stack 1 in a wet/dry state that is appropriate for electricity generation within a range that guarantees the electric power required by the load device 5.

Hereinafter, an operation to bring the wet/dry state of the fuel cell stack 1 to a dryer state, that is, to reduce excess water in the electrolyte membranes 111, will be referred to as a "dry operation." On the other hand, an operation to bring the wet/dry state of the fuel cell stack 1 to a wetter state, that is, to increase the amount of water in the electrolyte membranes 111, will be referred to as a "wet operation."

In wet/dry control, which denotes controlling of the wet/dry state of the fuel cell stack 1, the controller 200 controls the cathode gas flow rate, the cathode gas pressure, the anode gas flow rate, and the stack temperature.

The controller 200 controls the cathode gas flow rate mainly with the aid of the compressor 22, and controls the cathode gas pressure mainly with the aid of the cathode pressure control valve 26.

For example, in the dry operation, the controller 200 increases the cathode gas flow rate and reduces the cathode gas pressure to increase the amount of water discharged from the fuel cell stack 1. On the other hand, in the wet operation, the controller 200 reduces the cathode gas flow rate and increases the cathode gas pressure.

The controller 200 controls the anode gas flow rate mainly with the aid of the anode circulation pump 36.

The anode gas flowing in the anode gas flow passages 121 shown in FIG. 2 is humidified by water vapor that has leaked (has been transmitted) from the downstream side of the cathode gas flow passages 131 through the electrolyte membranes 111. Increasing the flow rate of the humidified anode gas will facilitate spreading of water contained in the anode gas from the upstream side through to the downstream side of the anode gas flow passages 121, thereby facilitating an increase in the wetness degree of the fuel cell stack 1.

In view of this, when the wet operation is executed, the controller 200 increases the flow rate of the anode gas circulated to the fuel cell stack 1 so as to increase the flow rate of the anode gas humidified inside the fuel cell stack 1. On the other hand, when the dry operation is executed, the controller 200 reduces the flow rate of the anode gas circulated to the fuel cell stack 1.

The controller 200 controls the stack temperature mainly with the aid of the cooling water pump 42.

Normally, as the temperature of the fuel cells 10 is higher than the stack inlet water temperature, reducing the flow rate of the cooling water flowing in the cooling water flow passages 141 shown in FIG. 2 will increase the temperature of the cathode gas flowing in the cathode gas flow passages 131 and the temperature of the fuel cells 10 itself. An increase in the temperature of the cathode gas in the cathode gas flow passages 131 will lead to an increase in the amount of water vapor that can be retained in the cathode gas, hence an increase in the amount of water discharged from the fuel cell stack 1. As described above, an increase in the stack temperature will lead to an increase in the amount of water discharged from the fuel cell stack 1. This reduces the wetness degree of the fuel cell stack 1.

In view of this, when the dry operation is executed, the controller 200 increases the stack temperature so as to increase the temperature of the cathode gas inside the fuel cell stack 1. On the other hand, when the wet operation is executed, the controller 200 reduces the stack temperature.

However, if the stack temperature is increased when the dry operation is executed, not only the temperature of the cathode gas, but also the temperature of the anode gas increases, thereby causing an increase in the amount of water vapor that can be retained in the anode gas. As a result, the amount of water vapor that moves from the cathode gas flow passages 131 to the anode gas flow passages 121 through the electrolyte membranes 111 increases. Due to this water vapor, the wetness degree of the electrolyte membrane 111 becomes less likely to decrease, thereby extending a period of time required for the dry operation. The inventors have found that, in some circumstances, an increase in the amount of water vapor that moves to the anode gas flow passages 121 could be the cause of an increase in the amount of water in the electrolyte membranes 111 during the dry operation.

In view of this, in the dry operation, the controller 200 according to the present embodiment performs reduction control for reducing the flow rate of the anode gas circulated to the fuel cell stack 1, in priority to temperature increasing control for increasing the stack temperature.

Figure 4:
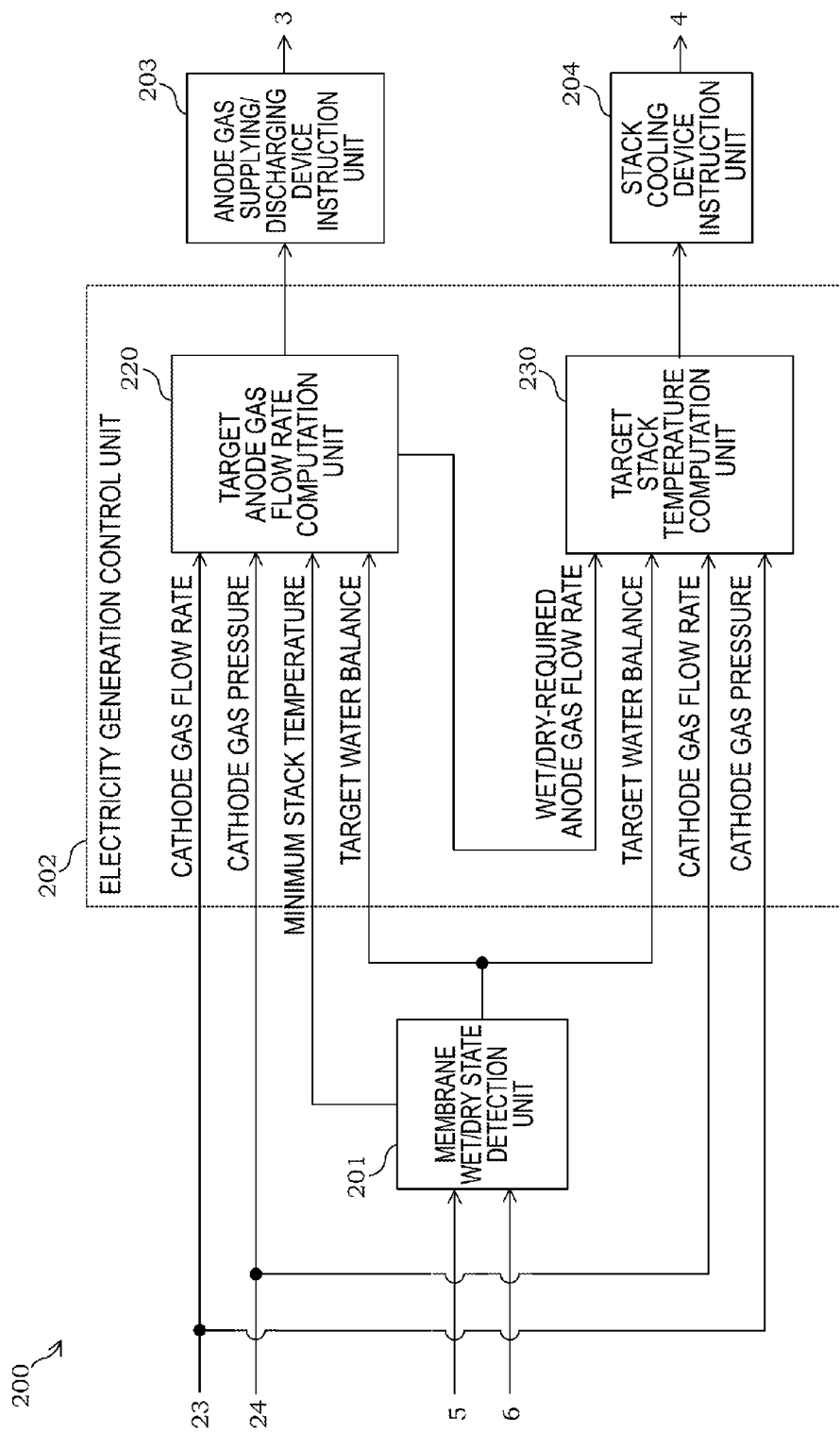
FIG. 4 is a block diagram showing an exemplary functional configuration of a controller that controls the fuel cell system.

FIG. 4 is a block diagram showing an exemplary functional configuration of the controller 200 according to the present embodiment. FIG. 4 shows control parameters that are used in the execution of the dry operation.

The controller 200 includes a membrane wet/dry state detection unit 201, an electricity generation control unit 202, an anode gas supplying/discharging device instruction unit 203, and a stack cooling device instruction unit 204. The electricity generation control unit 202 includes a target anode gas flow rate computation unit 220 and a target stack temperature computation unit 230.

The membrane wet/dry state detection unit 201 constitutes wet/dry state detection unit for detecting the wet/dry state of the electrolyte membranes 111 in the fuel cell stack 1.

The membrane wet/dry state detection unit 201 obtains the HFR of the fuel cell stack 1, which is measured by the impedance measuring device 6, as wet/dry state information indicating the wetness degree of the electrolyte membranes 111. Hereinafter, the HFR output from the impedance measuring device 6 will be referred to as the "measured HFR."

On the basis of the measured HFR from the impedance measuring device 6, the membrane wet/dry state detection unit 201 computes a target water balance for keeping the wet/dry state of the electrolyte membranes 111 appropriate for electricity generation. The target water balance is a parameter that indicates excess or deficiency in water relative to a target wet/dry state of the electrolyte membranes 111. That is, the target water balance is a parameter that correlates with the wetness degree of the electrolyte membranes 111.

For example, when the measured HFR is lower than a target value, the membrane wet/dry state detection unit 201 determines that the electrolyte membranes 111 contain a large amount of water, and sets a negative (−) value smaller than zero (0) as the target water balance. When it is determined that the electrolyte membranes 111 contain a small amount of water, the electricity generation control unit 202 executes the wet operation for increasing the amount of water in the electrolyte membranes 111.

On the other hand, when the measured HFR is higher than the target value, the membrane wet/dry state detection unit 201 determines that the electrolyte membranes 111 contain a small amount of water, and sets a positive (+) value larger than zero as the target water balance. When it is determined that the electrolyte membranes 111 contain a small amount of water, the electricity generation control unit 202 executes the dry operation for reducing excess water in the electrolyte membranes 111.

The membrane wet/dry state detection unit 201 outputs the computed target water balance to the target anode gas flow rate computation unit 220 and the target stack temperature computation unit 230.

Furthermore, when the wet operation is executed, the membrane wet/dry state detection unit 201 outputs, for example, the stack temperature as the temperature of the cathode gas flowing inside the fuel cell stack 1 to the target anode gas flow rate computation unit 220.

On the other hand, when the dry operation is executed, the membrane wet/dry state detection unit 201 computes a minimum stack temperature, which is an operating temperature for bringing the electrolyte membranes 111 into the wettest state through the wet operation.

A lower limit of a range in which the temperature of the fuel cell stack 1 can be adjusted by the stack cooling device 4 in the wet operation is set as the minimum stack temperature. That is, the minimum stack temperature is an operating temperature that is used at the time of the wet operation so as to maximize the amount of water in the electrolyte membranes 111 within a range that enables stable control over the electricity generation by the fuel cell stack 1.

For example, the higher the electric power required by the load device 5, the larger the amount of heat dissipated by the fuel cell 10, and the higher the minimum stack temperature set by the membrane wet/dry state detection unit 201. The membrane wet/dry state detection unit 201 outputs the computed minimum stack temperature to the target anode gas flow rate computation unit 220.

The membrane wet/dry state detection unit 201 may generate wet/dry state information using the temperature of the fuel cell stack 1 instead of using the measured HFR. In this case, the membrane wet/dry state detection unit 201 calculates an average of the stack inlet water temperature and the stack outlet water temperature as the temperature of the fuel cell stack 1. Then, the membrane wet/dry state detection unit 201 generates wet/dry state information corresponding to the calculated average with reference to a preset wet/dry estimation map, and calculates the target water balance on the basis of the generated wet/dry state information.

Alternatively, the membrane wet/dry state detection unit 201 may generate wet/dry state information using the electric power required by the load device 5 instead of using the measured HFR. In this case, the membrane wet/dry state detection unit 201 obtains the required electric power from the control unit for the load device 5, and generates wet/dry state information corresponding to the obtained required electric power with reference to a preset wet/dry estimation map. For example, the higher the electric power required by the load device 5, the larger the amount of generated water accompanying electricity generation, and the higher the wetness degree of the electrolyte membranes 111 indicated by the wet/dry state information generated by the membrane wet/dry state detection unit 201.

The electricity generation control unit 202 constitutes electricity generation control unit for controlling the electricity generation by the fuel cell 10 by controlling supply of the anode gas by the anode pressure control valve 33 and the anode circulation pump 36 and supply of the cathode gas by the compressor 22 and the cathode pressure control valve 26.

When executing the dry operation, the electricity generation control unit 202 reduces the anode gas flow rate and increases the stack temperature in accordance with the magnitude of the target water balance compared with when executing the wet operation. That is, when reducing the amount of water in the electrolyte membranes 111 in accordance with a signal from the membrane wet/dry state detection unit 201, the electricity generation control unit 202 reduces the anode gas circulation flow rate, and also increases the temperature of the cathode gas flowing inside the fuel cell stack 1 in accordance with the signal from the membrane wet/dry state detection unit 201, compared with when increasing the amount of water in the electrolyte membranes 111.

In the present embodiment, when executing the dry operation, the electricity generation control unit 202 performs control to reduce the anode gas flow rate with the aid of the anode circulation pump 36 in priority to control to increase the stack temperature with the aid of the cooling water pump 42.

The target anode gas flow rate computation unit 220 computes a target anode gas flow rate for controlling the flow rate of the anode gas supplied to the fuel cell stack 1.

The target anode gas flow rate computation unit 220 computes a load-required anode gas flow rate, which is necessary for the electricity generation by the fuel cell stack 1, on the basis of the electric power required by the load device 5. The target anode gas flow rate computation unit 220 also computes a wet/dry-required anode gas flow rate for maintaining the wet/dry state of the fuel cell stack 1. The target anode gas flow rate computation unit 220 outputs the higher of the load-required anode gas flow rate and the wet/dry-required anode gas flow rate as the target anode gas flow rate to the anode gas supplying/discharging device instruction unit 203.

In the present embodiment, the target anode gas flow rate computation unit 220 obtains the target water balance and the minimum stack temperature from the membrane wet/dry state detection unit 201, obtains a measured value of the cathode gas flow rate from the flow rate sensor 23, and obtains a measured value of the cathode gas pressure from the pressure sensor 24.

The target anode gas flow rate computation unit 220 computes the wet/dry-required anode gas flow rate, which is used in the wet/dry control, on the basis of the target water balance, the minimum stack temperature, the measured value of the cathode gas flow rate, and the measured value of the cathode gas pressure.

The target anode gas flow rate computation unit 220 increases the wet/dry-required anode gas flow rate as the target water balance increases, so as to increase the amount of water in the electrolyte membranes 111. On the other hand, the target anode gas flow rate computation unit 220 reduces the wet/dry-required anode gas flow rate as the target water balance decreases, so as to reduce the amount of water in the electrolyte membranes 111.

The target anode gas flow rate computation unit 220 reduces the wet/dry-required anode gas flow rate as the minimum stack temperature decreases, so as to reduce the amount of water in the anode gas circulated to the fuel cell stack 1. On the other hand, the target anode gas flow rate computation unit 220 increases the wet/dry-required anode gas flow rate as the minimum stack temperature increases.

In the present embodiment, the minimum stack temperature set by the membrane wet/dry state detection unit 201 is normally lower than a measured value of the stack temperature. Therefore, in the dry operation, the target anode gas flow rate computation unit 220 can reduce the wet/dry-required anode gas flow rate compared with when the measured value of the stack temperature is used. Furthermore, by using the minimum stack temperature, the wet/dry-required anode gas flow rate can be reduced much faster within a range that enables safe operation of the fuel cell system 100.

The target anode gas flow rate computation unit 220 outputs the computed wet/dry-required anode gas flow rate to the target stack temperature computation unit 230.

The target stack temperature computation unit 230 computes the target stack temperature for adjusting the temperature of the fuel cell stack 1. The target stack temperature computation unit 230 outputs the target stack temperature to the stack cooling device instruction unit 204.

The target stack temperature computation unit 230 obtains the wet/dry-required anode gas flow rate from the target anode gas flow rate computation unit 220, and obtains the target water balance from the membrane wet/dry state detection unit 201. The target stack temperature computation unit 230 also obtains the measured value of the cathode gas flow rate from the flow rate sensor 23, and obtains the measured value of the cathode gas pressure from the pressure sensor 24.

The target stack temperature computation unit 230 computes the target stack temperature, which is used in the wet/dry control, on the basis of the wet/dry-required anode gas flow rate, the target water balance, the measured value of the cathode gas flow rate, and the measured value of the cathode gas pressure.

The target stack temperature computation unit 230 reduces the target stack temperature as the target water balance increases, so as to reduce the amount of water in the cathode gas discharged from the fuel cell stack 1. On the other hand, the target stack temperature computation unit 230 increases the target stack temperature as the target water balance decreases, so as to increase the amount of water discharged from the fuel cell stack 1.

The anode gas supplying/discharging device instruction unit 203 controls the rotation speed of the anode circulation pump 36 and the opening degree of the anode pressure control valve 33 so that the circulation flow rate of the anode gas circulated to the fuel cell stack 1 matches the target anode gas flow rate.

The stack cooling device instruction unit 204 controls the rotation speed of the cooling water pump 42 so that the temperature of the fuel cell stack 1 matches the target stack temperature. Note that when the opening degree of the three-way valve 45 is controlled by the controller 200, the stack cooling device instruction unit 204 controls the rotation speed of the cooling water pump 42 and the opening degree of the three-way valve 45 so that the temperature of the fuel cell stack 1 matches the target stack temperature.

Figure 5:
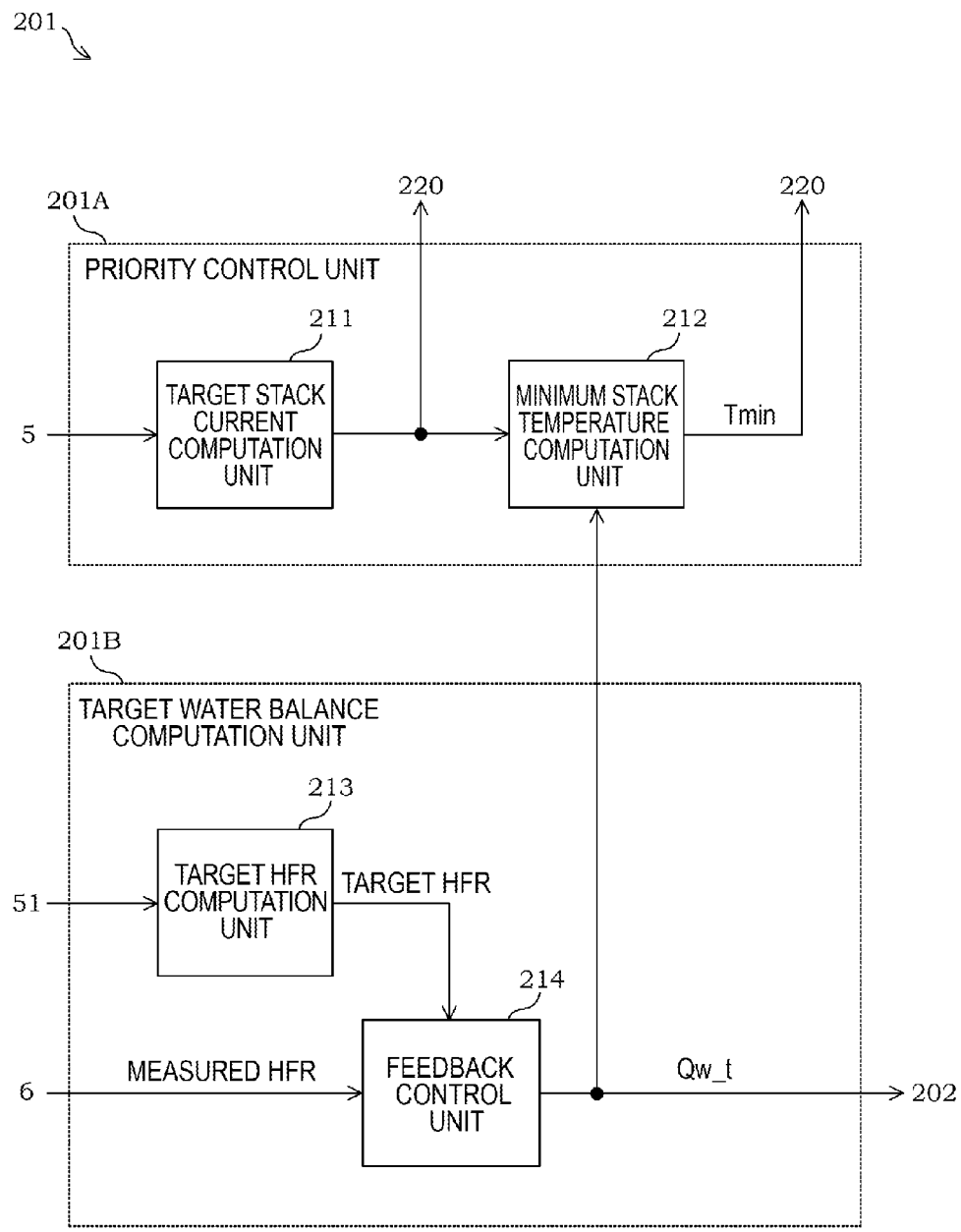
FIG. 5 shows an exemplary functional configuration for detecting a wet/dry state of electrolyte membrane in fuel cell.

FIG. 5 is a block diagram showing an exemplary functional configuration of the membrane wet/dry state detection unit 201.

The membrane wet/dry state detection unit 201 includes a priority control unit 201A and a target water balance computation unit 201B.

The priority control unit 201A sets the order of control over the operations of the anode gas supplying/discharging device 3 and the operations of the stack cooling device 4. When the dry operation for reducing the amount of water in the electrolyte membranes 111 is executed, the priority control unit 201A controls the operations of the anode gas supplying/discharging device 3 in priority to the operations of the stack cooling device 4.

In the present embodiment, when the electricity generation control unit 202 executes the dry operation, the priority control unit 201A sets the minimum stack temperature at the time of the wet operation in the target anode gas flow rate computation unit 220. The priority control unit 201A includes a target stack current computation unit 211 and a minimum stack temperature computation unit 212.

The target stack current computation unit 211 computes a target stack current on the basis of a load connected to the fuel cell stack 1. For example, the I-V (current-voltage) characteristics of the fuel cell stack 1 are recorded in the target stack current computation unit 211 in advance. Upon obtaining the electric power required by the load device 5, the target stack current computation unit 211 calculates, as the target stack current, a current that yields the obtained electric power to be generated with reference to the I-V characteristics of the fuel cell stack 1. Note that the I-V characteristics of the fuel cell stack 1 may be estimated on the basis of the stack output current and the stack output voltage that are obtained by changing the output current of the fuel cell stack 1.

The target stack current computation unit 211 outputs the target stack current to the target anode gas flow rate computation unit 220 and the minimum stack temperature computation unit 212.

On the basis of the target stack current, the minimum stack temperature computation unit 212 computes the minimum stack temperature Tmin achieved when the fuel cell stack 1 has been cooled to the coldest state within an operating range of the stack cooling device 4.

In the present embodiment, a minimum stack temperature map indicating a correspondence between the target stack current and the minimum stack temperature is recorded in the minimum stack temperature computation unit 212 in advance. The details of the minimum stack temperature map will be described later with reference to FIG. 6.

Upon obtaining the target stack current, the minimum stack temperature computation unit 212 calculates the minimum stack temperature $T_{min}$ corresponding to the obtained target stack current with reference to the minimum stack temperature map. Note that the minimum stack temperature computation unit 212 may compute the minimum stack temperature $T_{min}$ on the basis of the rotation speed of the cooling water pump 42, the opening degree of the three-way valve 45, and so forth.

Furthermore, on the basis of the target water balance from a feedback control unit 214, the minimum stack temperature computation unit 212 determines which one of the dry operation for reducing the amount of water in the electrolyte membranes 111 or the wet operation for increasing the amount of water in the electrolyte membranes 111 is to be executed.

For example, the minimum stack temperature computation unit 212 determines that the dry operation is to be started when the target water balance is larger than a preset upper limit threshold. Alternatively, the minimum stack temperature computation unit 212 may obtain the target water balance at a predetermined sampling interval, and determine that the dry operation is to be started when a current value of the target water balance is smaller than a previous value of the target water balance.

When the minimum stack temperature computation unit 212 determines that the dry operation is to be started, it outputs the minimum stack temperature $T_{min}$ to the target anode gas flow rate computation unit 220.

For example, if an abnormality occurs in the cooling water compressor 42 and the three-way valve 45, it may become impossible to perform the temperature increasing control for increasing the stack temperature. In this case, the minimum stack temperature computation unit 212 outputs the measured value of the stack temperature in place of the minimum stack temperature $T_{min}$. In this case, the minimum stack temperature computation unit 212 calculates an average of a detected value from the inlet water temperature sensor 46 and a detected value from the outlet water temperature sensor 47 as the measured value of the stack temperature. Note that computation in the minimum stack temperature computation unit 212 may be suspended when the stack temperature is uncontrollable.

When the stack temperature is uncontrollable, the wet/dry-required anode gas flow rate is calculated using the actual temperature of the cooling water supplied to the fuel cell stack 1 (the actual stack temperature), and thus the dry operation appropriate for an abnormal state of a stack temperature control system can be executed.

On the other hand, when the minimum stack temperature computation unit 212 determines that the wet operation is to be started, it outputs an average of the stack inlet water temperature and the stack outlet water temperature as the measured value of the stack temperature. Note that when the minimum stack temperature computation unit 212 determines that the wet operation is to be started, it may output the minimum stack temperature $T_{min}$ similarly to when it determines that the dry operation is to be started.

The target water balance computation unit 201B includes a target HFR computation unit 213 and the feedback control unit 214.

In accordance with the operating condition of the fuel cell stack 1, the target HFR computation unit 213 computes a target HFR for controlling the electrolyte membranes 111 to be in the target wet/dry state.

In the present embodiment, a membrane wet/dry control map indicating a correspondence between the stack output current and the target HFR is recorded in the target HFR computation unit 213 in advance. The details of the membrane wet/dry control map will be described later with reference to FIG. 7.

Upon obtaining the stack output current Is from the current sensor 51, the target HFR computation unit 213 calculates the target HFR corresponding to the obtained stack output current Is with reference to the membrane wet/dry control map.

Note that the target HFR computation unit 213 may compute the target HFR using a preset arithmetic expression on the basis of the stack output current Is. Furthermore, the target HFR computation unit 213 may compute the target HFR using the electric power required by the load device 5 instead of using the stack output current Is.

The target HFR computation unit 213 outputs the calculated target HFR to the feedback control unit 214.

The feedback control unit 214 computes the target water balance $Q_{w\_t}$ for increasing and decreasing the amount of water in the electrolyte membranes 111 so as to place the electrolyte membranes 111 in the target wet/dry state.

In the present embodiment, the feedback control unit 214 obtains the target HFR from the target HFR computation unit 213, and obtains the measured HFR from the impedance measuring device 6. The feedback control unit 214 then computes the target water balance $Q_{w\_t}$ so that the deviation between the measured HFR and the target HFR converges to zero.

For example, the feedback control unit 214 obtains the deviation between the measured HFR and the target HFR by subtracting the target HFR from the measured HFR, and calculates the target water balance by performing PI control on the basis of the obtained deviation.

The feedback control unit 214 outputs the calculated target water balance to the minimum stack temperature computation unit 212 and the target anode gas flow rate computation unit 220.

Figure 6:
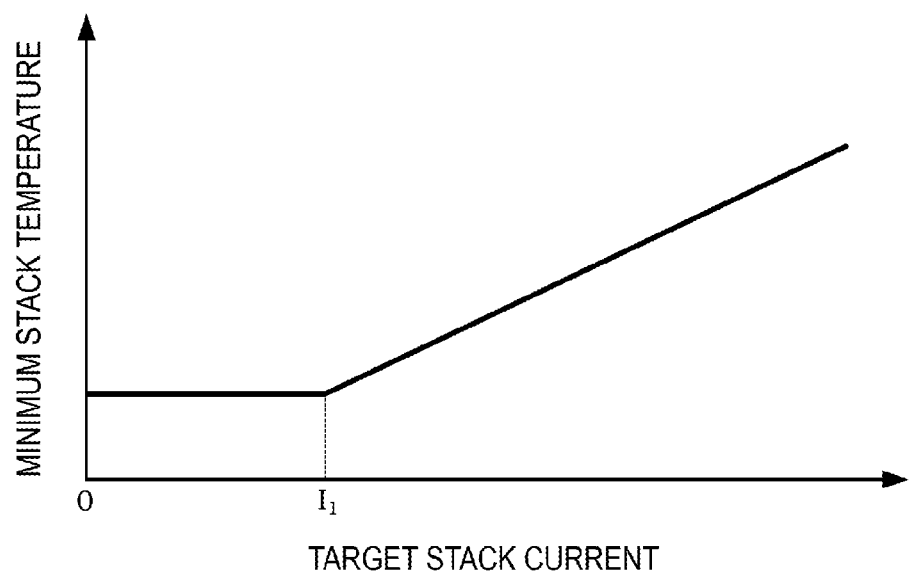
FIG. 6 shows an exemplary correspondence between the magnitude of a load connected to the fuel cells and a minimum temperature of the fuel cells.

FIG. 6 is a conceptual diagram showing an example of the minimum stack temperature map set in the minimum stack temperature computation unit 212. In FIG. 6, a horizontal axis represents the target stack current. The larger the target stack current, the higher the electric power output from the fuel cell stack 1. On the other hand, a vertical axis represents the minimum stack temperature.

In the membrane wet/dry control map, different levels of the minimum stack temperature are set in one-to-one correspondence with different levels of the target stack current. The minimum stack temperature is a value of the stack temperature that was measured or calculated in advance when the rotation speeds of the cooling water pump 42 and the fan provided in the radiator 43 were set to their respective, predetermined upper limits.

When the target stack current is within a small current range from zero to a predetermined current value $I_1$, the minimum stack temperature is constant because the amount of heat generated in the fuel cell stack 1 is small.

When the target stack current is within a large current range that exceeds the predetermined current value $I_1$, the amount of heat generated in the fuel cell stack 1 increases, and thus the minimum stack temperature increases as the target stack current increases.

Figure 7:
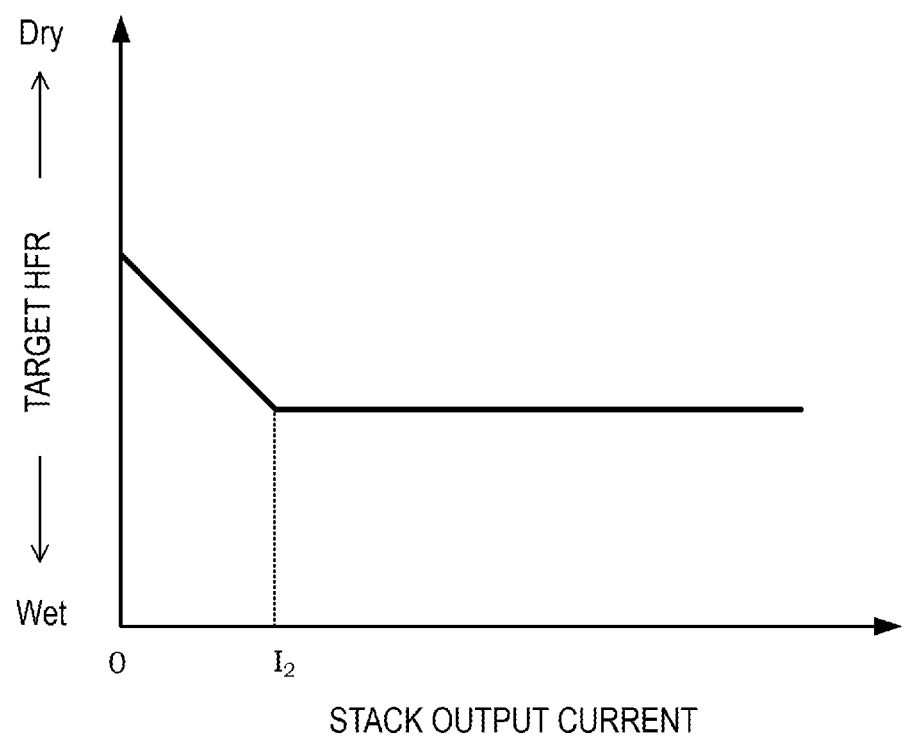
FIG. 7 shows a correspondence between the magnitude of the load connected to the fuel cell and a target wet/dry state of the electrolyte membrane.

FIG. 7 is a conceptual diagram showing an example of the membrane wet/dry control map set in the target HFR computation unit 213.

In FIG. 7, a horizontal axis represents the stack output current. The larger the stack output current, the higher the electric power output from the fuel cell stack 1. Furthermore, a vertical axis represents the target HFR. The electrolyte membranes 111 dry more easily as the target HFR increases. The electrolyte membranes 111 wet more easily as the target HFR decreases.

In the membrane wet/dry control map, the target HFR is set in such a manner that the flow of the cathode gas is not inhibited by liquid water retained in the cathode gas flow passages 131.

When the stack output current is within a small current range from zero to a predetermined current value $I_2$, the target HFR decreases as the stack output current increases.

The target HFR is set in this manner because the flow of the cathode gas is inhibited more easily by liquid water retained in the cathode gas flow passages 131 as the flow rate of the cathode gas supplied to the fuel cell stack 1 decreases. For this reason, the target HFR that is set at the time of a low-load operation, in winch the load device 5 requires low electric power, is higher than the target HFR that is set at the time of a normal operation.

When the stack output current is within a large current range that exceeds the predetermined current value $I_2$, the cathode gas flow rate becomes sufficiently high, and thus the influence of liquid water retained inside the fuel cell stack 1 becomes small. Therefore, the target HFR within the large current range is set to a constant value that is smaller than the target HFR within the small current range.

Figure 8:
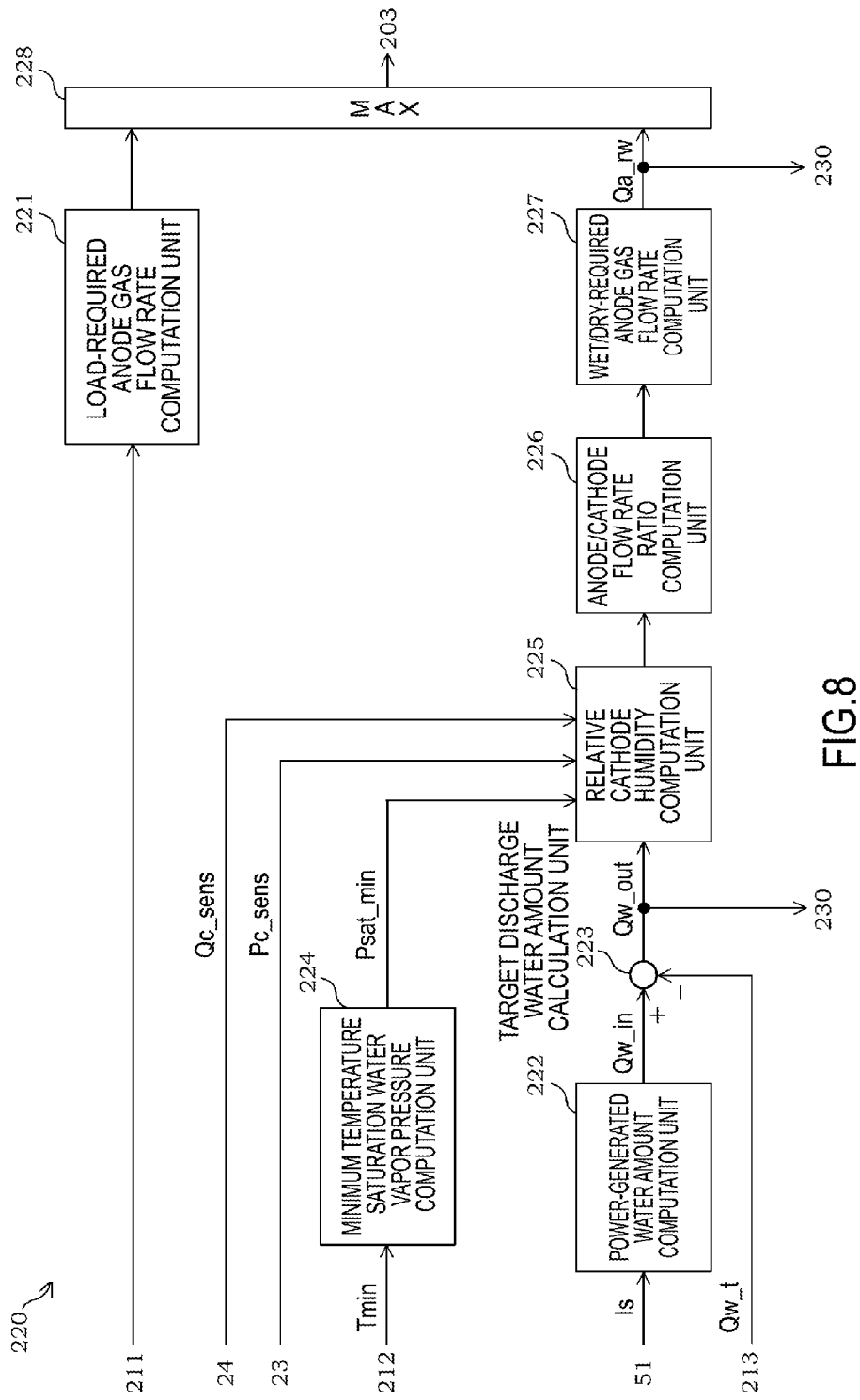
FIG. 8 shows an exemplary functional configuration for computing a target flow rate of the anode gas supplied to the fuel cell.

FIG. 8 is a block diagram showing an exemplary functional configuration of the target anode gas flow rate computation unit 220.

The target anode gas flow rate computation unit 220 includes a load-required anode gas flow rate computation unit 221, a power-generated water amount computation unit 222, a target discharge water amount calculation unit 223, a minimum temperature saturation water vapor pressure computation unit 224, and a relative cathode humidity computation unit 225. The target anode gas flow rate computation unit 220 also includes an anode/cathode flow rate ratio computation unit 226, a wet/dry-required anode gas flow rate computation unit 227, and a target anode gas flow rate setting unit 228.

On the basis of the electric power required by the load device 5, the load-required anode gas flow rate computation unit 221 computes a load-required flow rate, which is a minimum anode gas flow rate necessary for the electricity generation by the fuel cell stack 1.

For example, a load-required flow rate map indicating a correspondence between the target stack current and the anode gas flow rate is recorded in the load-required anode gas flow rate computation unit 221 in advance. Upon obtaining the target stack current from the target stack current computation unit 211, the load-required anode gas flow rate computation unit 221 calculates the anode gas flow rate corresponding to the obtained target stack current as the load-required flow rate with reference to the load-required flow rate map.

The load-required anode gas flow rate computation unit 221 outputs the calculated load-required flow rate to the target anode gas flow rate setting unit 228.

On the basis of the output current of the fuel cell stack 1, the power-generated water amount computation unit 222 computes a power-generated water amount, which is a total amount of water generated due to the electricity generation by the fuel cell 10 in the fuel cell stack 1.

In the present embodiment, the power-generated water amount computation unit 222 obtains the stack output current Is from the current sensor 51, and calculates the power-generated water amount $Q_{w\_in}$ in accordance with the following expression (3) on the basis of the stack output current Is.

[Math. 1]

$$Q_{w\_in} = \frac{N \cdot Is}{2F} \times 60 \times 22.4 \tag{3}$$

Note that N denotes the number of the fuel cells 10, and F[C/mol] denotes the Faraday constant (96485.39). Furthermore, "60" is a value obtained as a result of conversion from seconds (sec) to minutes (min), and "22.4" is a volume of one mole (mol) of an ideal gas at normal conditions.

The power-generated water amount computation unit 222 outputs the calculated power-generated water amount $Q_{w\_in}$ to the target discharge water amount calculation unit 223.

The target discharge water amount calculation unit 223 calculates a target discharge water amount $Q_{w\_out}$, which is the amount of water to be discharged from the fuel cell stack 1, by calculating a difference between the power-generated water amount $Q_{w\_in}$ and the target water balance $Q_{w\_t}$. In the present embodiment, the target discharge water amount calculation unit 223 calculates the target discharge water amount $Q_{w\_out}$ by subtracting the target water balance $Q_{w\_t}$ from the power-generated water amount $Q_{w\_in}$ in accordance with the following expression (4).

[Math. 2]

$$Q_{w\_out} = Q_{w\_in} - Q_{w\_t} \tag{4}$$

On the basis of the minimum stack temperature $T_{min}$ set by the priority control unit 201A, the minimum temperature saturation water vapor pressure computation unit 224 computes a saturation water vapor pressure $P_{sat\_min}$ at the minimum stack temperature $T_{min}$.

In the present embodiment, the minimum temperature saturation water vapor pressure computation unit 224 obtains the minimum stack temperature $T_{min}$ from the minimum stack temperature computation unit 212, and calculates the minimum temperature saturation water vapor pressure $P_{sat\_min}$ in accordance with the following expression (5) on the basis of the minimum stack temperature $T_{min}$.

[Math. 3]

$$P_{sat\_min} = \frac{1}{7.5} \times 10^{8.02754 - \frac{1705.616}{231.405 + T_{min}}} \tag{5}$$

According to the expression (5), the higher the minimum stack temperature $T_{min}$, the higher the minimum temperature saturation water vapor pressure $P_{sat\_min}$. The minimum temperature saturation water vapor pressure computation unit 224 outputs the calculated minimum temperature saturation water vapor pressure $P_{sat\_min}$ to the relative cathode humidity computation unit 225.

On the basis of the minimum temperature saturation water vapor pressure $P_{sat\_min}$, the relative cathode humidity computation unit 225 computes a relative cathode outlet humidity $RH_{c\_out}$, which indicates a ratio of the humidity of the cathode gas to the humidity of the anode gas in the fuel cell stack 1.

In the present embodiment, the relative cathode outlet humidity $RH_{c\_out}$ is a value obtained by dividing the humidity of the cathode gas at the outlet (downstream) side of the cathode gas flow passages 131 shown in FIG. 2 by the humidity of the anode gas at the inlet (upstream) side of the anode gas flow passages 121.

The relative cathode humidity computation unit 225 obtains the measured value of the cathode gas flow rate $Q_{c\_sens}$ from the flow rate sensor 23, and obtains the measured value of the cathode gas pressure $P_{c\_sens}$ from the pressure sensor 24. The relative cathode humidity computation unit 225 calculates the relative cathode outlet humidity $RH_{c\_out}$ in accordance with the following expression (6) on the basis of the minimum temperature saturation water vapor pressure $P_{sat\_min}$, the cathode gas pressure $P_{c\_sens}$, the cathode gas flow rate $Q_{c\_sens}$, and the target discharge water amount $Q_{w\_out}$.

[Math. 4]

$$RH_{c\_out\_min} = \frac{P_{c\_sens}}{P_{sat\_min}} \times \frac{Q_{w\_out}}{Q_{c\_sens} + Q_{w\_out}} \tag{6}$$

According to the expression (6), the higher the minimum temperature saturation water vapor pressure $P_{sat\_min}$, the lower the relative cathode outlet humidity $RH_{c\_out\_min}$. The relative cathode humidity computation unit 225 outputs the calculated relative cathode outlet humidity $RH_{c\_out\_min}$ to the anode/cathode flow rate ratio computation unit 226.

On the basis of the relative cathode outlet humidity $RH_{c\_out\_min}$, the anode/cathode flow rate ratio computation unit 226 computes an anode/cathode flow rate ratio $K_{ac\_min}$, which indicates a ratio of the anode gas flow rate to the cathode gas flow rate.

In the present embodiment, a flow rate ratio map indicating a correspondence between the relative cathode outlet humidity and the anode/cathode flow rate ratio is recorded in the anode/cathode flow rate ratio computation unit 226 in advance. The details of the flow rate ratio map will be described later with reference to FIG. 9.

Upon obtaining the relative cathode outlet humidity $RH_{c\_out\_min}$ from the relative cathode humidity computation unit 225, the anode/cathode flow rate ratio computation unit 226 calculates the anode/cathode flow rate ratio $K_{ac\_min}$ corresponding to the relative cathode outlet humidity $RH_{c\_out\_min}$ with reference to the flow rate ratio map.

The anode/cathode flow rate ratio computation unit 226 outputs the calculated anode/cathode flow rate ratio $K_{ac\_min}$ to the wet/dry-required anode gas flow rate computation unit 227.

On the basis of the anode/cathode flow rate ratio $K_{ac\_min}$, the wet/dry-required anode gas flow rate computation unit 227 computes a wet/dry-required anode gas flow rate $Q_{a\_rw}$ for placing the fuel cell stack 1 in the target wet/dry state.

The wet/dry-required anode gas flow rate computation unit 227 calculates the wet/dry-required anode gas flow rate $Q_{a\_rw}$ by multiplying the measured value of the cathode gas flow rate $Q_{c\_sens}$ by the anode/cathode flow rate ratio $K_{ac\_min}$ in accordance with the following expression (7).

[Math. 5]

$$Q_{a\_rw} = K_{ac\_min} \times Q_{c\_sens} \quad (7)$$

The wet/dry-required anode gas flow rate computation unit 227 outputs the calculated wet/dry-required anode gas flow rate $Q_{a\_rw}$ to the target stack temperature computation unit 230 and the target anode gas flow rate setting unit 228.

The target anode gas flow rate setting unit 228 outputs the higher of the wet/dry-required anode gas flow rate $Q_{a\_rw}$ and the load-required flow rate from the load-required anode gas flow rate computation unit 221 as the target anode gas flow rate to the anode gas supplying/discharging device instruction unit 203.

Figure 9:
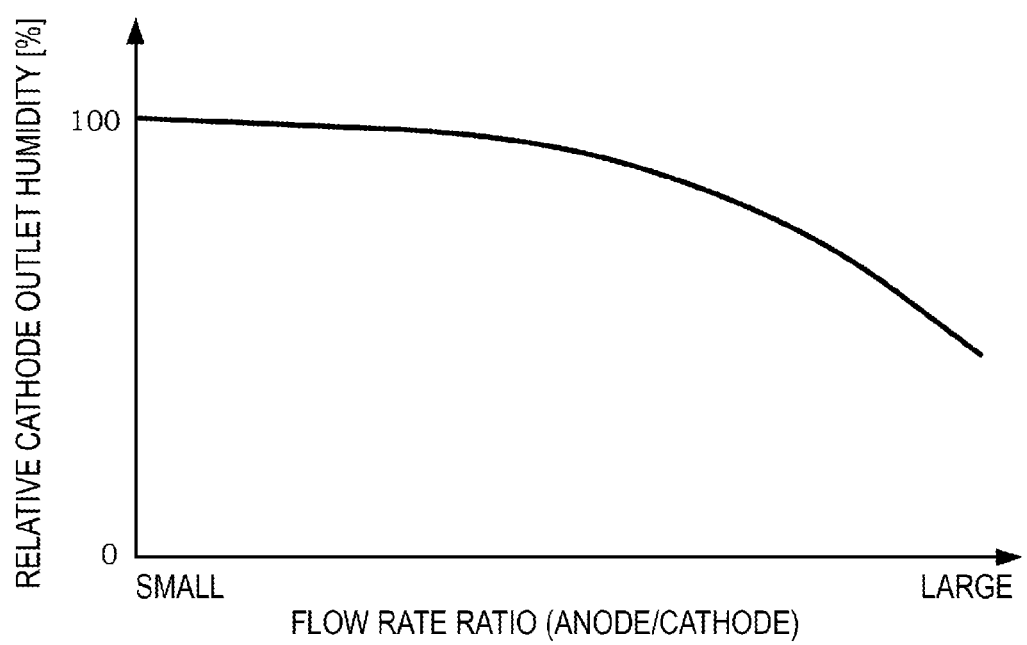
FIG. 9 shows a correspondence between a relative cathode gas humidity and a ratio between the flow rates of the anode gas and a cathode gas supplied to the fuel cell.

FIG. 9 is a conceptual diagram showing an example of the flow rate ratio map set in the anode/cathode flow rate ratio computation unit 226. In FIG. 9, a vertical axis represents the relative cathode outlet humidity, which indicates the relative humidity of the cathode gas discharged from the fuel cell stack 1. On the other hand, a horizontal axis represents the anode/cathode flow rate ratio, which indicates the ratio of the anode gas flow rate to the cathode gas flow rate.

The flow rate ratio map indicating the correspondence between the relative cathode outlet humidity and the anode/cathode flow rate ratio is set in advance on the basis of, for example, experiment data obtained by changing both the cathode gas flow rate and the anode gas flow rate in the present embodiment. Note that the characteristics of the flow rate ratio map are set using, for example, average values obtained by changing the cathode gas pressure, the stack temperature, the concentration of hydrogen, and the like, and values with small characteristic variations.

As shown in FIG. 9, the anode/cathode flow rate ratio $K_{ac\_min}$ based on the minimum stack temperature $T_{min}$ increases as the relative cathode outlet humidity $RH_{c\_out}$ decreases. In view of this, when the cathode gas flow rate is constant, the anode gas flow rate increases as the relative cathode outlet humidity $RH_{c\_out}$ decreases.

Therefore, in order to reduce the wet/dry-required anode gas flow rate $Q_{a\_rw}$ as much as possible at the time of the dry operation, it is necessary to increase the relative cathode outlet humidity $RH_{c\_out}$. As stated earlier, in order to increase the relative cathode outlet humidity $RH_{c\_out}$, it is necessary to reduce the saturation water vapor pressure $P_{sat\_min}$ in connection with the relationship shown in the expression (6). In order to reduce the saturation water vapor pressure $P_{sat\_min}$, it is necessary to reduce the value set as the stack temperature in connection with the relationship shown in the expression (5).

In view of this, in the present embodiment, when the priority control unit 201A shown in FIG. 5 determines that the dry operation is to be executed, it sets the minimum stack temperature $T_{min}$, in place of the measured value of the stack temperature, in the target anode gas flow rate computation unit 220.

Thus, compared with a case where the measured value of the stack temperature is simply used, the saturation water vapor pressure $P_{sat\_min}$ is reduced, and consequently, the relative cathode outlet humidity $RH_{c\_out}$ can be increased. Accordingly, at the time of the dry operation, the anode/cathode flow rate ratio $K_{pc\_sens}$ is reduced, and consequently, the wet/dry-required anode gas flow rate $Q_{a\_rw}$ can be quickly reduced.

Figure 10:
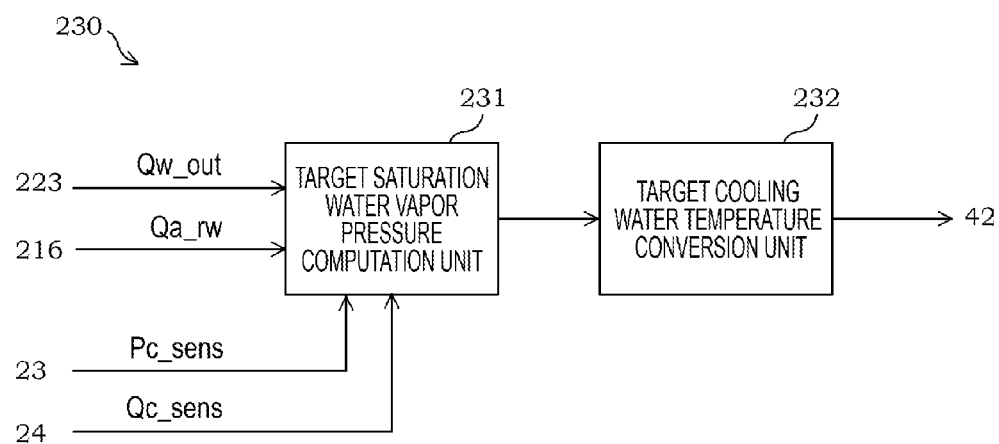
FIG. 10 shows an exemplary function configuration for computing a target temperature of cooling water supplied to a fuel cell stack.

FIG. 10 is a block diagram showing an exemplary functional configuration of the target stack temperature computation unit 230.

The target stack temperature computation unit 230 includes a target saturation water vapor pressure computation unit 231 and a target cooling water temperature conversion unit 232.

On the basis of the wet/dry-required anode gas flow rate $Q_{a\_rw}$, the target saturation water vapor pressure computation unit 231 computes a target saturation water vapor pressure $P_{sat\_t}$ for maintaining the wetness degree of the electrolyte membranes 111 at a target value.

In the present embodiment, the target saturation water vapor pressure computation unit 231 obtains the wet/dry-required anode gas flow rate $Q_{a\_rw}$, and obtains the measured value of the cathode gas flow rate $Q_{c\_sens}$ from the flow rate sensor 23. The target saturation water vapor pressure computation unit 231 then calculates the anode/cathode flow rate ratio $K_{ac}$ in accordance with the following expression (8) on the basis of the wet/dry-required anode gas flow rate $Q_{a\_rw}$ and the cathode gas flow rate $Q_{c\_sens}$.

[Math. 6]

$$K_{ac} = \frac{Q_{a\_rw}}{Q_{c\_sens}} \quad (8)$$

Once the target saturation water vapor pressure computation unit 231 has calculated the anode/cathode flow rate ratio $K_{ac}$, it calculates the relative cathode outlet humidity $RH_{c\_out}$ corresponding to the calculated anode/cathode flow rate ratio $K_{ac}$ with reference to the flow rate ratio map shown in FIG. 10.

Next, the target saturation water vapor pressure computation unit 231 obtains the measured value of the cathode gas pressure $P_{c\_sens}$ from the pressure sensor 24, and obtains the target discharge water amount $Q_{w\_out}$ from the target discharge water amount calculation unit 223. Note that the target saturation water vapor pressure computation unit 231 may obtain the target water balance $Q_{w\_t}$ from the membrane wet/dry state detection unit 201 as shown in FIG. 4, and compute the target discharge water amount $Q_{w\_out}$ on the basis of the expression (4).

Then, the target saturation water vapor pressure computation unit 231 calculates the target saturation water vapor pressure $P_{sat\_t}$ in accordance with the following expression (9) on the basis of the target discharge water amount $Q_{w\_out}$, the cathode gas pressure $P_{c\_sens}$, the relative cathode outlet humidity $RH_{c\_out}$, and the cathode gas flow rate $Q_{c\_sens}$.

[Math. 7]

$$P_{sat\_t} = \frac{P_{sens}}{RH_{c\_out}} \times \frac{Q_{w\_out}}{Q_{c\_sens} + Q_{w\_out}} \qquad (9)$$

The target saturation water vapor pressure computation unit 231 outputs the calculated target saturation water vapor pressure $P_{sat\_t}$ to the target cooling water temperature conversion unit 232.

The target cooling water temperature conversion unit 232 converts the target saturation water vapor pressure $P_{sat\_t}$ into a target cooling water temperature $T_t$, which is a target value of the cooling water temperature in the fuel cell stack 1. The target cooling water temperature conversion unit 232 calculates the target cooling water temperature $T_t$ in accordance with the following expression (10) on the basis of the target saturation water vapor pressure $P_{sat\_t}$.

[Math. 8]

$$T_t = \frac{1705.616}{8.02754 - \log_{10}(7.5 \times P_{sat\_t})} - 231.405 \qquad (10)$$

The target cooling water temperature conversion unit 232 outputs the target cooling water temperature $T_t$ as the target stack temperature to the stack cooling device instruction unit 204.

As described above, in connection with the relationships shown in the expressions (8) and (9) and in consideration of the characteristics of the relative cathode outlet humidity in the fuel cell 10, the target saturation water vapor pressure $P_{sat\_t}$ decreases as the wet/dry-required anode gas flow rate $Q_{a\_rw}$ decreases. Furthermore, in connection with the relationship shown in the expression (10), the target stack temperature Tt decreases as the target saturation water vapor pressure $P_{sat\_t}$ decreases. Accordingly, the target stack temperature $T_t$ decreases as the wet/dry-required anode gas flow rate $Q_{a\_rw}$ decreases. In view of the above, the electricity generation control unit 202 reduces the stack temperature as the anode gas flow rate decreases.

On the other hand, in connection with the relationship shown in the expression (9), the target saturation water vapor pressure $P_{sat\_t}$ increases as the target discharge amount $Q_{w\_out}$ increases, and as a result the target stack temperature Tt increases. In view of this, the electricity generation control unit 202 increases the stack temperature as the wetness degree of the electrolyte membranes 111 increases.

As a result, even in a state where the wet/dry-required anode gas flow rate $Q_{a\_rw}$ has been reduced, the electricity generation control unit 202 can promptly increase the target stack temperature unless the target discharge amount $Q_{w\_out}$ decreases. That is, when the electricity generation control unit 202 reduces the anode gas flow rate in the dry operation, an amount of increase in the stack temperature can be expanded unless the wetness degree of the fuel cell stack 1 decreases.

Figure 11:
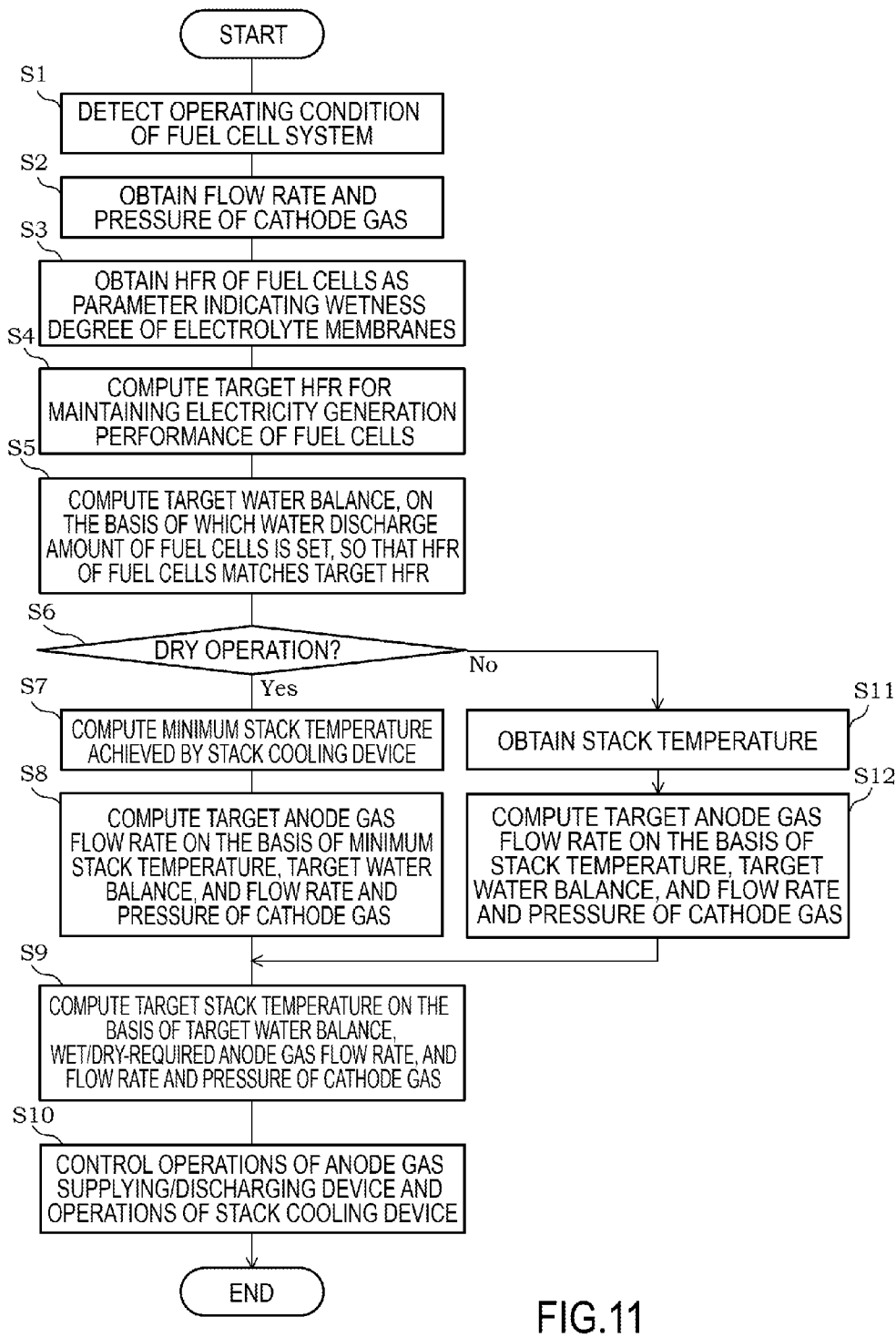
FIG. 11 is a flowchart showing an example of a control method for controlling the fuel cell system according to a first embodiment.

FIG. 11 is a flowchart showing an example of a control method for controlling the fuel cell system 100 according to the present embodiment. This control method is executed repeatedly at a predetermined interval.

In step S1, the controller 200 detects the operating condition of the fuel cell stack 1. In the present embodiment, the controller 200 detects the HFR of the fuel cell stack 1 using the impedance measuring device 6 shown in FIG. 3, detects the cathode gas flow rate using the flow rate sensor 23, and detects the cathode gas pressure using the pressure sensor 24. Note that step S1 constitutes a wet/dry state detection step of detecting the wet/dry state of the electrolyte membranes 111.

In step S2, the controller 200 obtains the measured value of the cathode gas flow rate from the flow rate sensor 23, and obtains the measured value of the cathode gas pressure from the pressure sensor 24.

In step S3, the controller 200 obtains the measured HFR, which correlates with the electrolyte membranes 111, as a parameter indicating the wet/dry state of the fuel cell stack 1 from the impedance measuring device 6.

In step S4, the controller 200 computes the target HFR for maintaining the electricity generation performance of the fuel cell stack 1. In the present embodiment, the target HFR computation unit 213 shown in FIG. 5 obtains the stack output current from the current sensor 51, and calculates the target HFR corresponding to the obtained stack output current using the target HFR map shown in FIG. 7.

In step S5, the membrane wet/dry state detection unit 201 of the controller 200 computes the target water balance for offsetting excess or deficiency in water relative to the wet/dry state of the electrolyte membranes 111, so that the measured HFR converges to the target HFR. In the present embodiment, the feedback control unit 214 shown in FIG. 5 calculates the target water balance on the basis of the target HFR and the measured HFR.

In step S6, the controller 200 determines whether the dry operation is to be executed on the basis of the wet/dry state of the electrolyte membranes 111. For example, the controller 200 determines that the dry operation is to be executed when the measured HFR is lower than the target HFR. In the present embodiment, the minimum stack temperature computation unit 212 shown in FIG. 5 determines whether the target water balance has exceeded a predetermined upper limit, and determines that the dry operation is to be executed if the target water balance has exceeded the predetermined upper limit.

When the dry operation executed, in step S7, the controller 200 computes the minimum stack temperature of the fuel cell stack 1 achieved by the stack cooling device 4. In the present embodiment, the minimum stack temperature computation unit 212 obtains the target stack current, and calculates the minimum stack temperature corresponding to the obtained target stack current using the minimum stack temperature map shown in FIG. 6.

When the dry operation is executed, in step S8, the controller 200 computes the target anode gas flow rate on the basis of the minimum stack temperature, the target water balance, the cathode gas flow rate, and the cathode gas pressure.

In the present embodiment, the power-generated water amount computation unit 222 calculates the power-generated water amount $Q_{w\_in}$ in accordance with the expression (3) on the basis of the stack output current $I_s$ from the current sensor 51. Next, the target discharge water amount calculation unit 223 calculates the target discharge water amount $Q_{w\_out}$ by subtracting the target water balance $Q_{w\_t}$ from the power-generated water amount $Q_{w\_in}$ in accordance with the expression (4).

Then, the minimum temperature saturation water vapor pressure computation unit 224 calculates the minimum temperature saturation water vapor pressure $P_{sat\_min}$ in accordance with the expression (5) on the basis of the minimum stack temperature $T_{min}$. Thereafter, the relative cathode humidity computation unit 225 calculates the relative cathode outlet humidity $RH_{c\_out\_min}$ in accordance with the expression (6) on the basis of the minimum temperature saturation water vapor pressure $P_{sat\_min}$, the cathode gas pressure $P_{c\_sens}$, the target discharge water amount $Q_{w\_out}$, and the cathode gas flow rate $Q_{c\_sens}$.

Furthermore, the anode/cathode flow rate ratio computation unit 226 calculates the anode/cathode flow rate ratio $K_{ac\_min}$ corresponding to the relative cathode outlet humidity $RH_{c\_out\_min}$ using the flow rate ratio map shown in FIG. 10. Then, the wet/dry-required anode gas flow rate computation unit 227 calculates the wet/dry-required anode gas flow rate $Q_{a\_rw}$ in accordance with the expression (7) on the basis of the anode/cathode flow rate ratio $K_{ac\_min}$.

Furthermore, the load-required anode gas flow rate computation unit 221 calculates the load-required anode gas flow rate on the basis of the target stack current, and the target anode gas flow rate setting unit 228 sets the higher of the load-required anode gas flow rate and the wet/dry-required anode gas flow rate as the target anode gas flow rate.

Next, in step S9, the electricity generation control unit 202 computes the target stack temperature on the basis of the wet/dry-required anode gas flow rate, the target water balance, the cathode gas pressure, and the cathode gas flow rate.

In the present embodiment, the target saturation water vapor pressure computation unit 231 calculates the anode/cathode flow rate ratio $K_{ac}$ in accordance with the expression (8) on the basis of the wet/dry-required anode gas flow rate $Q_{a\_rw}$ and the cathode gas flow rate $Q_{c\_sens}$. Then, the target saturation water vapor pressure computation unit 231 calculates the relative cathode outlet humidity $RH_{c\_out}$ corresponding to the anode/cathode flow rate ratio $K_{ac}$ using the flow rate ratio map shown in FIG. 10.

Thereafter, the target saturation water vapor pressure computation unit 231 calculates the target saturation water vapor pressure $P_{sat\_t}$ in accordance with the expression (9) on the basis of the relative cathode outlet humidity $RH_{c\_out}$, the target discharge water amount $Q_{w\_out}$, the cathode gas pressure $P_{c\_sens}$, and the cathode gas flow rate $Q_{c\_sens}$. Then, the target cooling water temperature conversion unit 232 calculates the target cooling water temperature $T_t$ in accordance with the expression (10) on the basis of the target saturation water vapor pressure $P_{sat\_t}$, and outputs the target cooling water temperature $T_t$ as the target stack temperature.

The foregoing steps S7 to S9 constitute an electricity generation control step of, when the amount of water in the electrolyte membranes 111 is reduced in accordance with a signal related to the wet/dry state of the electrolyte membranes 111, reducing the flow rate of the fuel and increasing the temperature of the oxidant in accordance with the signal indicating the wet/dry state of the electrolyte membranes 111 compared with when the amount of water in the electrolyte membranes 111 is increased.

In step S10, the controller 200 controls the rotation speed of the anode circulation pump 36 on the basis of the target anode gas flow rate, and controls the rotation speed of the cooling water pump 42 on the basis of the target stack temperature. That is, step S10 constitutes a flow rate adjustment step of adjusting the flow rate of the fuel supplied to the fuel cells 10, and a temperature adjustment step of adjusting the temperature of the oxidant supplied to the fuel cells 10.

If the controller 200 determines that the wet operation is to be executed in step S6, it proceeds to the process of step S11.

If the controller 200 determines that the wet operation is to be executed, it calculates the temperature of the fuel cell stack 1 in step S11. In the present embodiment, the controller 200 obtains the stack inlet water temperature from the inlet water temperature sensor 46, obtains the stack outlet temperature from the outlet water temperature sensor 47, and calculates an average of the stack inlet water temperature and the stack outlet water temperature as the stack temperature.

If the controller 200 determines that the dry operation is to be executed, it computes the target anode gas flow rate on the basis of the stack temperature calculated in step S11, the target water balance, the cathode gas flow rate, and the cathode gas pressure in step S12. Thereafter, the processes of steps S9 and S10 are sequentially executed, and then the control method for the fuel cell system 100 is ended.

FIGS. 12A to 12D are time charts showing changes in the operating condition of the fuel cell system 100 at the time of the dry operation in the present embodiment.

Figure 12:
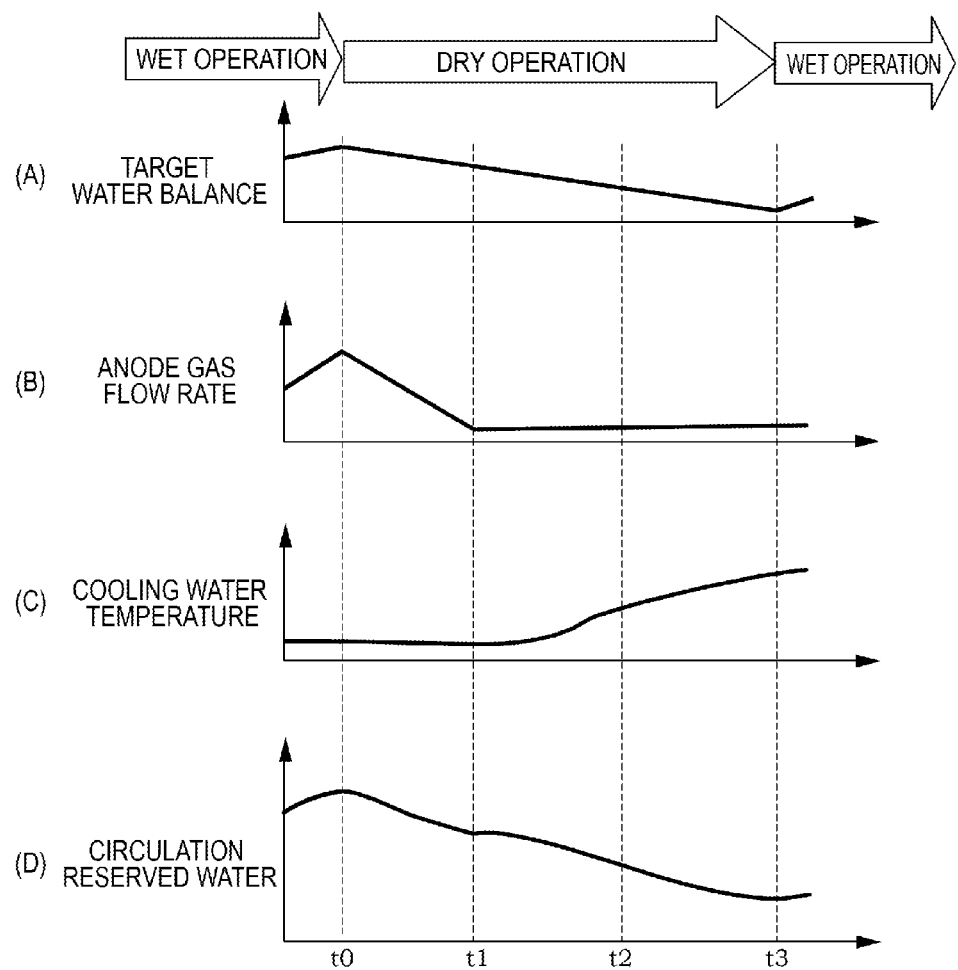
FIGS. 12A to 12D are time charts showing changes in the condition of the fuel cell system when a dry operation for reducing an amount of water in the electrolyte membrane is executed.
Figure 13:
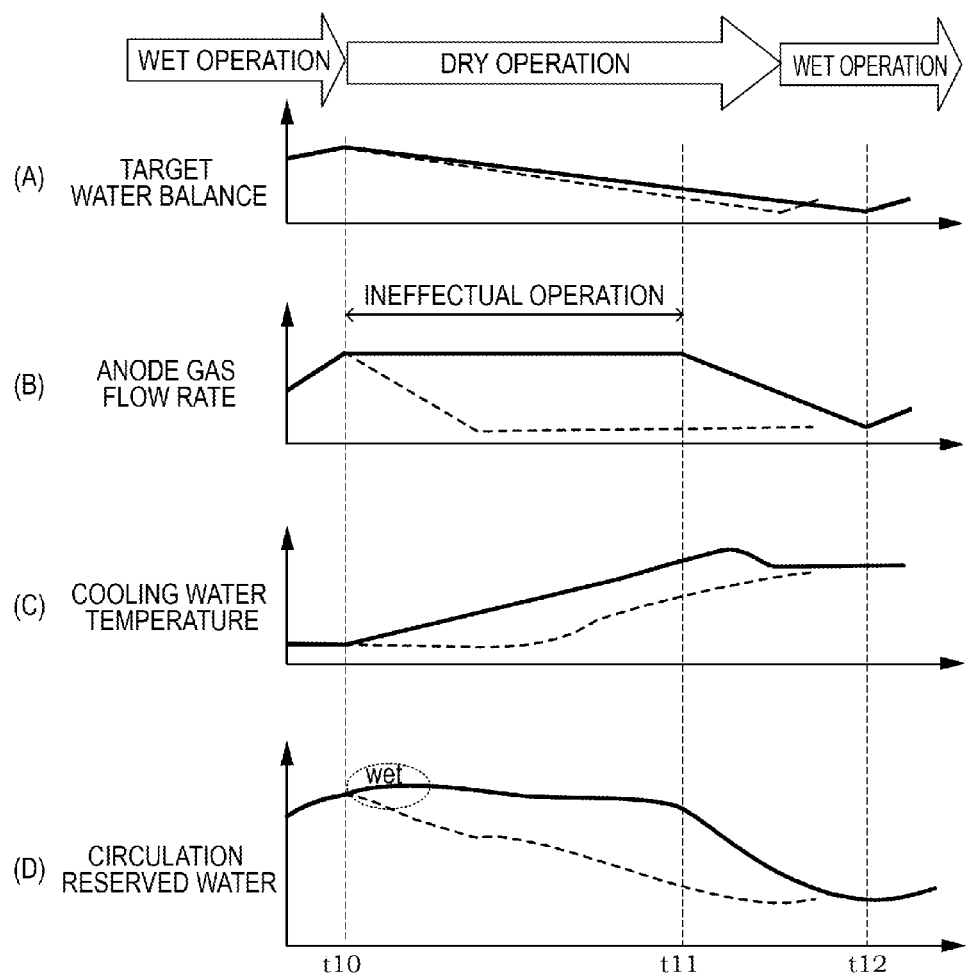
FIGS. 13A to 13D are time charts showing changes in the condition of the fuel cell system when the temperature of the fuel cells is used in place of the minimum temperature of the fuel cells in a dry operation.

FIG. 12A is a flowchart showing a change in the target water balance for offsetting excess or deficiency in water in the fuel cell stack 1. In FIG. 12A, the target water balance increases and decreases within a predetermined range so as to maintain the wetness degree of the electrolyte membranes 111 at the target value.

FIG. 12B is a flowchart showing a change in the flow rate of the anode gas supplied to the fuel cell stack 1. FIG. 12C is a flowchart showing a change in the temperature of the cooling water circulated to the fuel cell stack 1. An increase in the temperature of the cooling water causes an increase in the temperature of the cathode gas passing through the fuel cell stack 1, and an increase in the stack temperature.

FIG. 12D is a flowchart showing a change in circulation reserved water in the anode gas circulated to the fuel cell stack 1. The circulation reserved water denotes an amount of water vapor reserved in an anode gas circulation path from the ejector 34 to the suction port of the ejector 34 via the fuel cell stack 1. Horizontal axes in FIGS. 12A to 12D represent a common time axis.

At time t0, the target water balance changes from an upturn to a downturn as shown in FIG. 12A. Accordingly, the priority control unit 201A determines that the electricity generation control unit 202 is to execute the dry operation, and sets the minimum stack temperature as the cathode gas temperature in the target anode gas flow rate computation unit 220.

Then, the target anode gas flow rate computation unit 220 calculates the wet/dry-required anode gas flow rate on the basis of the target water balance and the minimum stack temperature. Here, as the wet/dry-required anode gas flow rate is higher than the load-required flow rate, the target anode gas flow rate computation unit 220 outputs the wet/dry-required anode gas flow rate as the target anode gas flow rate.

The minimum stack temperature is lower than the actual stack temperature. Thus, the amount of reduction, that is, the speed of reduction in the target anode gas flow rate per unit of time is high compared with a case where the actual stack temperature is used. As a result, the rotation speed of the anode circulation pump 36 decreases, and the flow rate of the anode gas passing through the fuel cell stack 1 decreases. Accordingly, the amount of water vapor mixed into the anode gas decreases, and hence the circulation reserved water decreases as shown in FIG. 12D.

Meanwhile, the target stack temperature computation unit 230 calculates the target stack temperature on the basis of the wet/dry-required anode gas flow rate and the target water balance. As the wet/dry-required anode gas flow rate is set to a small value along with a decrease in the target water balance as stated earlier, the target stack temperature does not increase and is maintained constant.

Therefore, before the temperature of the cooling water increases, the anode gas flow rate decreases so as to reduce the target water balance as shown in FIGS. 12A to 12C.

As described above, from time t0 to time t1, the anode gas flow rate is reduced so as to follow a decrease in the target water balance, and thus an increase in the stack temperature can be restrained.

At time t1, the reduced anode gas flow rate hits a predetermined lower limit as shown in FIG. 12B. Accordingly, the target stack temperature computation unit 230 increases the target stack temperature along with a decrease in the target water balance.

As the rotation speed of the cooling water pump 42 is reduced in accordance with the increase in the target stack temperature, the heat exchange rate between the cooling water and the fuel cell stack 1 decreases, and the temperature of the cooling water decreases. At this time, as shown in FIG. 12C, the temperature of the cooling water increases gradually because a certain period of time is required for the temperature of the cooling water to reach the target value. This slows down a decrease in the circulation reserved water as shown in FIG. 12D.

From time t12 to time t13, while the anode gas flow rate is maintained at the lower limit, the temperature of the cooling water increases as the target water balance decreases as shown in FIGS. 12A to 12C. This reduces the circulation reserved water as shown in FIG. 12D.

As described above, after the dry operation for reducing the anode gas flow rate using the anode circulation pump 36 (the reduction control) is restricted, the dry operation for increasing the cathode gas temperature using the cooling water pump 42 (the temperature increasing control) is executed. That is, in the dry operation, the controller 200 performs the reduction control for reducing the anode gas flow rate using the anode circulation pump 36 in priority to the temperature increasing control for increasing the cathode gas temperature using the cooling water pump 42.

FIGS. 13A to 13D are time charts showing changes in the operating condition of the fuel cell system in a comparative example in which the temperature increasing control for increasing the cathode gas temperature is executed before the reduction control for reducing the anode gas flow rate.

At time t10, the dry operation is started, and the temperature of the cooling water increases before the anode gas flow rate decreases as shown in FIG. 13C.

Accordingly, the anode gas temperature increases, and so does the amount of water vapor in the anode gas. This leads to an increase in the circulation reserved water as shown in FIG. 13D. Furthermore, as the anode gas flow rate is maintained constant, the circulation reserved water is maintained in the increased state. As a result, the wetness degree of the electrolyte membranes 111 becomes less likely to decrease. Thus, the dry operation takes time. If the cathode gas flow rate is increased in an attempt to reduce the target water balance within a predetermined period of time, the electric power consumed by the compressor 22 increases.

At time t11 when the temperature of the cooling water reaches a predetermined upper limit, the rotation speed of the anode circulation pump 36 is reduced, and the anode gas flow rate is reduced as shown in FIG. 13A.

As shown in FIGS. 13A to 13D, if the temperature increasing control for increasing the cooling water temperature is executed before the reduction control for reducing the anode gas flow rate, the circulation reserved water increases. Thus, the wetness degree of the electrolyte membranes 111 becomes less likely to decrease, and a period of time required for the dry operation is extended. Furthermore, the operation performed from time t10 to t11 to keep the rotation speed of the anode circulation pump 36 constant until completion of the temperature increasing control for increasing the cooling water temperature is ineffectual. This ineffectual operation increases the electric power consumed by the anode circulation pump 36.

According to the first embodiment of the present invention, the fuel cell system 100 includes the anode gas supplying/discharging device 3 serving as the fuel supply unit for supplying the fuel (anode gas) to the electrolyte membrane 111 of the fuel cell 10, and the cathode gas supplying/discharging device 2 serving as the oxidant supply unit for supplying the oxidant (cathode gas) to the electrolyte membrane 111. The fuel cell system 100 also includes the controller 200 serving as the electricity generation control unit for controlling the electricity generation by the fuel cell 10 by controlling the supply of the oxidant from the cathode gas supplying/discharging device 2 and the supply of the fuel from the anode gas supplying/discharging device 3.

The fuel cell system 100 further includes the impedance measuring device 6 serving as the wet/dry state detection unit for detecting the wet/dry state of the electrolyte membrane 111, the anode circulation pump 36 serving as a flow rate adjustment unit for adjusting the flow rate of the fuel supplied to the fuel cell 10, and the stack cooling device 4 serving as the temperature adjustment unit for adjusting the temperature of the oxidant supplied to the fuel cell 10.

This fuel cell system 100 is controlled by the controller 200. The controller 200 obtains a signal related to the wetness degree of the electrolyte membrane 111 from the impedance measuring device 6, and determines whether to execute the dry operation, which reduces excess water in the electrolyte membrane 111, or to execute the wet operation in accordance with the obtained signal.

When the dry operation is executed, the controller 200 reduces the flow rate of the fuel supplied to the fuel cells 10, and also increases the temperature of the oxidant flowing in the fuel cells 10 in accordance with the signal from the impedance measuring device 6, compared with when the wet operation is executed.

Therefore, when the dry operation for reducing the wetness degree of the electrolyte membranes 111 is executed, the controller 200 reduces the anode gas flow rate, and also increases the temperature of the fuel cells 10 using the stack cooling device 4 if the wetness degree of the electrolyte membranes 111 does not drop to the target value for maintaining the electricity generation performance.

Furthermore, when the dry operation is executed, if there is a gap between the wetness degree of the electrolyte membrane 111 and the target value despite the reduction in the anode gas flow rate, the controller 200 increases the temperature of the fuel cells 10 while reducing the anode gas flow rate.

On the other hand, at the time of the dry operation, if the wetness degree of the electrolyte membrane 111 follows the target value along with the reduction in the anode gas flow rate, the controller 200 restrains an increase in the temperature of the fuel cells 10.

As described above, when reducing the amount of water in the electrolyte membrane 111, the controller 200 reduces the flow rate of the anode gas supplied to the fuel cells 10, and also increases the temperature of the cathode gas in accordance with the wetness degree of the electrolyte membrane 111, compared with when increasing the amount of water in the electrolyte membrane 111.

This makes it possible to restrain an increase in the amount of water in the anode gas caused by an increase in the temperature of the fuel cells 10 before reducing the anode gas flow rate in the dry operation. Thus, a period of time required to reduce excess water in the electrolyte membranes 111 can be shortened. As a result, the wet/dry state of the fuel cells 10 can be efficiently controlled.

Furthermore, in the dry operation, the controller 200 increases the rotation speed of the compressor 22 so as to increase the cathode gas flow rate compared with the wet operation. Therefore, the electric power consumed by the compressor 22 becomes higher as the dry operation takes longer. In view of this, the present embodiment can cut down the ineffectual operation shown in FIG. 13, and reduce excess water in the electrolyte membrane 111. Thus, the increase in the electric power consumed by the fuel cell system 100 can be restrained, and the wet/dry state of the fuel cell 10 can be efficiently controlled.

Furthermore, according to the present embodiment, when the dry operation is executed, the controller 200 performs the reduction control for reducing the anode gas flow rate using the anode circulation pump 36 in priority to the temperature increasing control for increasing the cathode gas temperature using the cooling water pump 42.

Accordingly, a period of time required for the dry operation can be shortened as stated earlier. In addition, as the rotation speed of the anode circulation pump 36 is reduced first, the electric power consumed by the anode circulation pump 36 can be reduced compared with a case where the rotation speed of the cooling water pump 42 is reduced first as shown in FIG. 13C.

Furthermore, according to the present embodiment, in the dry operation, the controller 200 increases the stack temperature so that the target water balance, which correlates with the wetness degree of the electrolyte membranes 111 and is equivalent to a difference between the measured HFR and the target HFR, converges to zero while reducing the anode gas flow rate.

That is, when reducing the amount of water in the electrolyte membranes 111, the electricity generation control unit 202 reduces the anode gas flow rate, and also increases the temperature of the cathode gas so as to reduce a difference between the wetness degree of the electrolyte membranes 111 and the target value.

In this way, when simply reducing the anode gas flow rate does not reduce the wetness degree of the electrolyte membranes 111, the temperature increasing control for increasing the stack temperature is performed, thereby supplementing the reduction control for reducing the anode gas flow rate. Therefore, even if there is a large gap between the wetness degree of the electrolyte membranes 111 and the target value, excess water in the electrolyte membranes 111 can be promptly discharged, and a period of time required for the dry operation can be shortened.

Furthermore, according to the present embodiment, the controller 200 includes the priority control unit 201A, the target anode gas flow rate computation unit 220, and the target stack temperature computation unit 230.

The priority control unit 201A sets the order of control over the operations of the cooling water pump 42 and the operations of the anode circulation pump 36. When the dry operation is executed, the priority control unit 201A prioritizes the operations of the anode circulation pump 36 over the operations of the cooling water pump 42, thereby causing the anode circulation pump 36 to operate in priority to the cooling water pump 42.

In the present embodiment, when the dry operation is executed, the priority control unit 201A sets the minimum stack temperature, which is set to increase the amount of water in the electrolyte membranes 111 to an upper limit in the wet operation, as the cathode gas temperature of the fuel cells 10 in the target anode gas flow rate computation unit 220.

When the dry operation is executed, the target anode gas flow rate computation unit 220 reduces the anode gas flow rate on the basis of the minimum stack temperature and the target water balance that is based on the measured HFR. The target stack temperature computation unit 230 controls the temperature of the fuel cell stack 1 on the basis of the target anode gas flow rate for the wet/dry control and the target water balance.

That is, when the dry operation is executed, the target anode gas flow rate computation unit 220 reduces the flow rate of the anode gas supplied to the fuel cells 10 on the basis of a temperature lower than the temperature of the fuel cells 10 and the wetness degree of the electrolyte membranes 111. At the same time, the target stack temperature computation unit 230 controls the temperature of the fuel cells 10 on the basis of the target anode gas flow rate and the wetness degree of the electrolyte membranes 111.

In the present embodiment, as described with reference to FIG. 8, the target anode gas flow rate computation unit 220 reduces the target anode gas flow rate for the wet/dry control as the stack temperature decreases. At the same time, as described with reference to FIG. 10, the target stack temperature computation unit 230 increases the target stack temperature as the target anode gas flow rate decreases.

In this way, at the time of the dry operation, the target anode gas flow rate computation unit 220 receives the stack temperature at the time of the wet operation (low-temperature control) as an input. Accordingly, with the aid of the target stack temperature computation unit 230, the target anode gas flow rate computation unit 220 recognizes that the dry operation is not executed, but the wet operation is executed. Therefore, the target anode gas flow rate computation unit 220 further increases the extent of reduction in the anode gas flow rate per unit of time compared with a case where a current stack temperature higher than the stack temperature at the time of the wet operation is used. On the other hand, as the target stack temperature computation unit 230 receives, as an input, the target anode gas flow rate for the wet/dry control, the target anode gas flow rate computation unit 220 increases the stack temperature as usual.

Therefore, when the dry operation is executed, the controller 200 can perform the reduction control for reducing the anode gas flow rate in priority to the temperature increasing control for increasing the stack temperature. As a result, a period of time required for the dry operation can be shortened.

Furthermore, according to the present embodiment, the priority control unit 201A sets a predetermined lower limit of a range in which the stack temperature can be adjusted by the stack cooling device 4 as the minimum stack temperature. In this way, the controller 200 can maximize the speed of reduction in the flow rate of the anode gas supplied to the fuel cell stack 1 within a range that enables stable control over the fuel cell stack 1. As a result, a period of time required for the dry operation can be further shortened.

Furthermore, according to the present embodiment, when the dry operation is executed, the target anode gas flow rate computation unit 220 makes the speed of reduction in the anode gas flow rate higher than the speed of reduction in a case where the measured value of the temperature of the fuel cell stack 1 is used instead of the minimum stack temperature. The target stack temperature computation unit 230 reduces the target stack temperature as the target anode gas flow rate for the wet/dry control decreases, and increases the target stack temperature as the wetness degree of the electrolyte membranes 111 increases.

In this way, when simply reducing the anode gas flow rate does not reduce the wetness degree of the electrolyte membranes 111, the stack temperature is increased. On the other hand, when simply reducing the anode gas flow rate reduces the wetness degree of the electrolyte membranes 111, an increase in the stack temperature can be restrained. Therefore, the target stack temperature computation unit 230 can supplement the dry operation that is executed with the aid of the target anode gas flow rate computation unit 220 while restraining ineffectual temperature increasing control.

Furthermore, according to the present embodiment, the anode gas supplying/discharging device 3 includes the anode gas circulation passage 35 that circulates the anode gas discharged from the fuel cells 10 back to the fuel cells 10, and the anode circulation pump 36 that is provided in the anode gas circulation passage 35 to adjust the circulation flow rate of the anode gas circulated to the fuel cells 10.

Therefore, in the fuel cell system 100 that circulates the anode gas to the fuel cell stack 1, due to water contained in the anode gas, the wetness degree of the electrolyte membranes 111 easily increases as the anode gas circulation flow rate increases.

In view of this, according to the present embodiment, when the dry operation is executed, the controller 200 can reduce the amount of water in the anode gas circulated to the fuel cells 10 via the anode gas circulation passage 35 by reducing the anode gas circulation flow rate.

Thus, the controller 200 increases the stack temperature after reducing the anode gas circulation flow rate. In this way, the stack temperature is increased after reducing the amount of water inside the fuel cell stack 1. Accordingly, the dry operation can be efficiently executed while suppressing the humidification of the electrolyte membranes 111 attributed to water in the anode gas.

Furthermore, according to the present embodiment, as shown in FIG. 2, each fuel cell 10 includes the cathode gas flow passages 131 that allow the cathode gas to flow therethrough while facing one surface of the electrolyte membrane 111, and the anode gas flow passages 121 that allow the anode gas to flow therethrough in a direction opposite to a direction of the cathode gas flowing in the cathode gas flow passages 131, while facing the other surface of the electrolyte membrane 111. Each fuel cell 10 also includes the cooling water flow passages 141 that are formed near the upper surfaces of the cathode gas flow passages 131 in such a manner that each cooling water flow passage 141 is located between neighboring anode gas flow passages 121 and cathode gas flow passages 131. The cooling water flow passages 141 allow the cooling water (refrigerant) for cooling the fuel cell 10 to flow therethrough. The stack cooling device 4 supplies the cooling water to the cooling water flow passages 141 in the same direction as the cathode gas flowing in the cathode gas flow passages 131. The anode gas supplying/discharging device 3 circulates the anode gas that is discharged from one end of each anode gas flow passage 121 to the other end of each anode gas flow passage 121.

In the foregoing fuel cells 10, as the cooling water passes through the cooling water flow passages 141, the cathode gas temperature is higher at the downstream side of the cathode gas flow passages 131 than at the upstream side of the cathode gas flow passages 131. Along with the flow of the cathode gas from the upstream side to the downstream side of the cathode gas flow passages 131, the amount of water in the cathode gas increases. Therefore, the cathode gas at the downstream side of the cathode gas flow passages 131 contains a larger amount of water vapor than the cathode gas at the upstream side of the cathode gas flow passages 131.

Water vapor at the downstream side of the cathode gas flow passages 131 is transmitted through the electrolyte membranes 111 and mixed into the anode gas at the upstream side of the anode gas flow passages 121. Thus, the anode gas at the upstream side of the anode gas flow passages 121 contains water vapor. As this anode gas proceeds downstream in the anode gas flow passages 121, water vapor therein is transmitted through the electrolyte membranes 111 and returns to the anode gas at the upstream side of the cathode gas flow passages 131. In this way, water vapor associated with the electricity generation is circulated inside the fuel cells 10.

In the fuel cells 10 configured in the foregoing manner, if the stack temperature is increased when executing the dry operation, not only the cathode gas but also the anode gas increases in temperature, and thus the amount of water vapor circulated inside the fuel cells 10 easily increases. In view of this, in the present embodiment, the stack temperature is increased after reducing the circulation flow rate of the anode gas supplied to the fuel cells 10 in the dry operation. As a result, the dry operation for the fuel cell stack 1 can be executed more efficiently.

Furthermore, according to the present embodiment, the impedance measuring device 6 detects the impedance of the fuel cells 10, and outputs a signal indicating the detected impedance as a parameter that correlates with the wetness degree of the electrolyte membranes 111 to the controller 200. On the basis of this impedance, the membrane wet/dry state detection unit 201 calculates the target water balance that correlates with the wetness degree of the electrolyte membranes 111. In this way, the electricity generation control unit 202 can accurately execute the dry operation for reducing the wetness degree of the electrolyte membranes 111.

Second Embodiment

In the foregoing embodiment, the target stack temperature is calculated using the wet/dry-required anode gas flow rate. When the load-required flow rate is selected as the target anode gas flow rate, this calculation method may cause the dry operation to take extra time due to a large gap between the wet/dry-required anode gas flow rate and the actual anode gas flow rate.

In view of this, a second embodiment of the present invention introduces an example of a fuel cell system that reduces a gap between the target value of the anode gas flow rate used in the calculation of the target stack temperature and the flow rate of the anode gas supplied to the fuel cell stack 1. Note that the fuel cell system according to the present embodiment is configured similarly to the fuel cell system 100 shown in FIG. 3.

Figure 14:
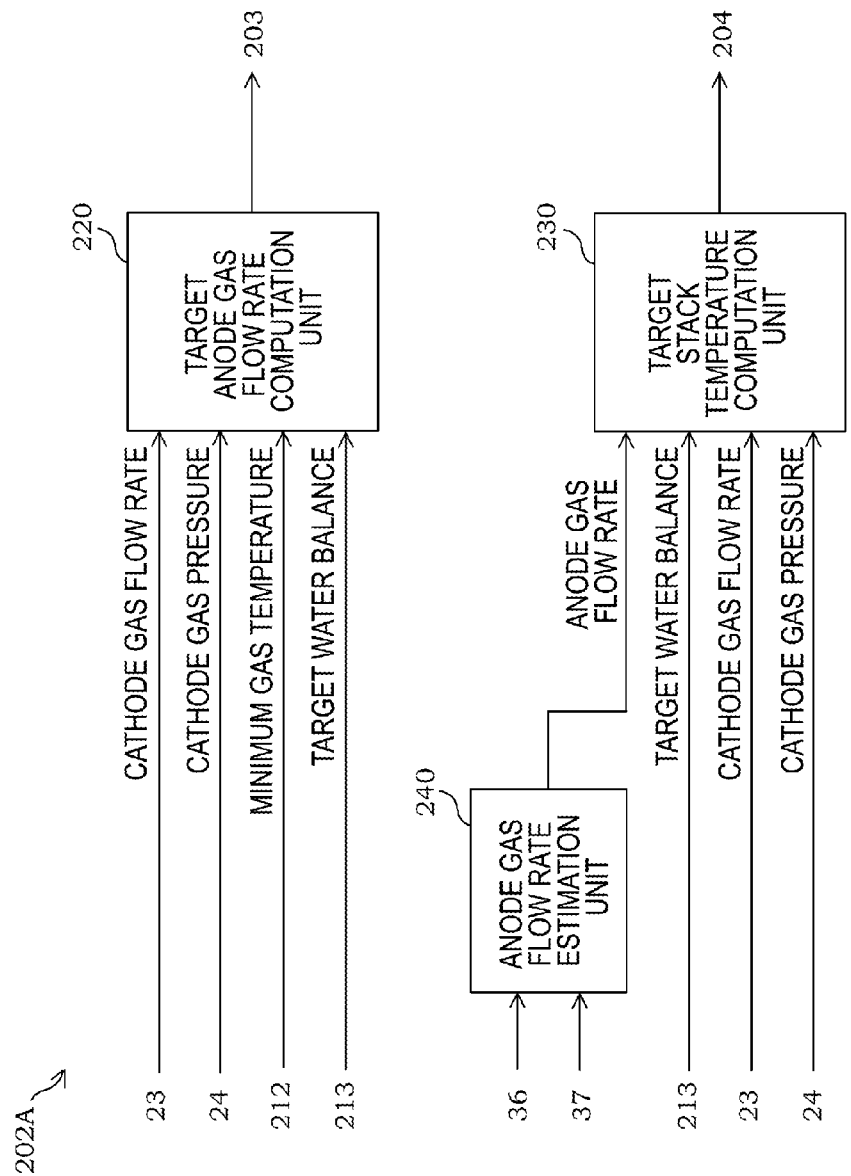
FIG. 14 shows an exemplary functional configuration for controlling the electricity generation by the fuel cells according to a second embodiment of the present invention.

FIG. 14 is a block diagram showing an exemplary configuration of an electricity generation control unit 202A according to the second embodiment of the present invention.

In the present embodiment, the electricity generation control unit 202A computes the target stack temperature using an estimated value of the anode gas flow rate instead of using the wet/dry-required anode gas flow rate. The electricity generation control unit 202A includes an anode gas flow rate estimation unit 240 in addition to the components shown in FIG. 4. As other components are similar to those according to the first embodiment, they are given the same reference signs thereas, and a description thereof will be omitted.

The anode gas flow rate estimation unit 240 estimates the flow rate of the anode gas supplied to the fuel cell stack 1. The anode gas flow rate estimation unit 240 estimates the anode gas flow rate on the basis of the operating condition of the anode gas supplying/discharging device 3.

In the present embodiment, a flow rate estimation map indicating a correspondence between the rotation speed of the anode circulation pump 36 and the anode gas flow rate is recorded in the anode gas flow rate estimation unit 240 in advance. The details of the flow rate estimation map will be described later with reference to FIG. 15.

The anode gas flow rate estimation unit 240 obtains the rotation speed of the anode circulation pump 36 from, for example, a rotation speed sensor provided in the anode circulation pump 36. Upon obtaining the rotation speed of the anode circulation pump 36, the anode gas flow rate estimation unit 240 calculates the anode gas flow rate corresponding to the obtained rotation speed with reference to the flow rate estimation map. The anode gas flow rate estimation unit 240 outputs the calculated anode gas flow rate to the target stack temperature computation unit 230.

As described above, the anode gas flow rate estimation unit 240 sets the estimated value of the anode gas flow rate, instead of the wet/dry-required anode gas flow rate, in the target stack temperature computation unit 230. In this way, the target stack temperature is calculated in accordance with the actual anode gas flow rate. Therefore, the dry operation, which is based on the anode gas flow rate, can be appropriately supplemented by controlling the stack temperature. Note that the anode gas flow rate estimation unit 240 may be provided in the priority control unit 201 A shown in FIG. 5.

Figure 15:
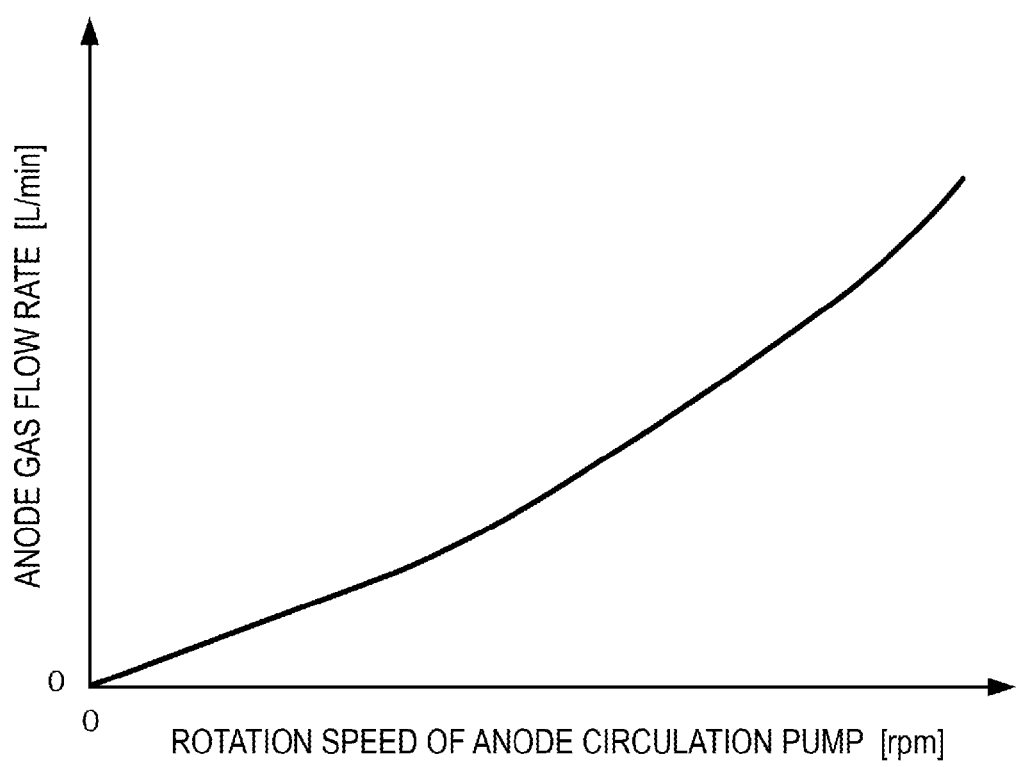
FIG. 15 shows a correspondence between the operation of an anode circulation pump and an anode gas flow rate.

FIG. 15 shows an example of the flow rate estimation map that is set in the anode gas flow rate estimation unit 240. In FIG. 15, a horizontal axis represents the rotation speed of the anode circulation pump 36, and a vertical axis represents the anode gas flow rate.

As shown in FIG. 15, the anode gas flow rate increases as the rotation speed of the anode circulation pump 36 increases.

Note that the target stack temperature computation unit 230 calculates the target stack temperature using the anode gas flow rate [NL/min] at normal conditions. NL (Normal Liter) denotes a liter at normal conditions.

Therefore, the anode gas flow rate estimation unit 240 converts the anode gas flow rate $Q$ [L/min] that has been calculated using the flow rate estimation map shown in FIG. 15 into the anode gas flow rate $Q_0$ [NL/min] at normal conditions.

Specifically, the anode gas flow rate estimation unit 240 obtains the anode gas pressure P from the pressure sensor 37, and obtains the stack inlet water temperature T from the inlet water temperature sensor 46. Then, the anode gas flow rate estimation unit 240 calculates the anode gas flow rate $Q_0$ at normal conditions in accordance with the following expression (11) on the basis of the anode gas flow rate $Q$, the anode gas pressure P, and the stack inlet water temperature T.

[Math. 9]

$$Q_0 = Q \times \frac{273.15 \times P}{101.33(T + 273.15)} \quad (11)$$

The anode gas flow rate estimation unit 240 outputs the anode gas flow rate $Q_0$ at normal conditions to the target stack temperature computation unit 230. Then, the target stack temperature computation unit 230 substitutes the wet/dry-required anode gas flow rate $Q_{a\_rw}$ in the expression (8) with the anode gas flow rate $Q_0$ at normal conditions.

Figure 16:
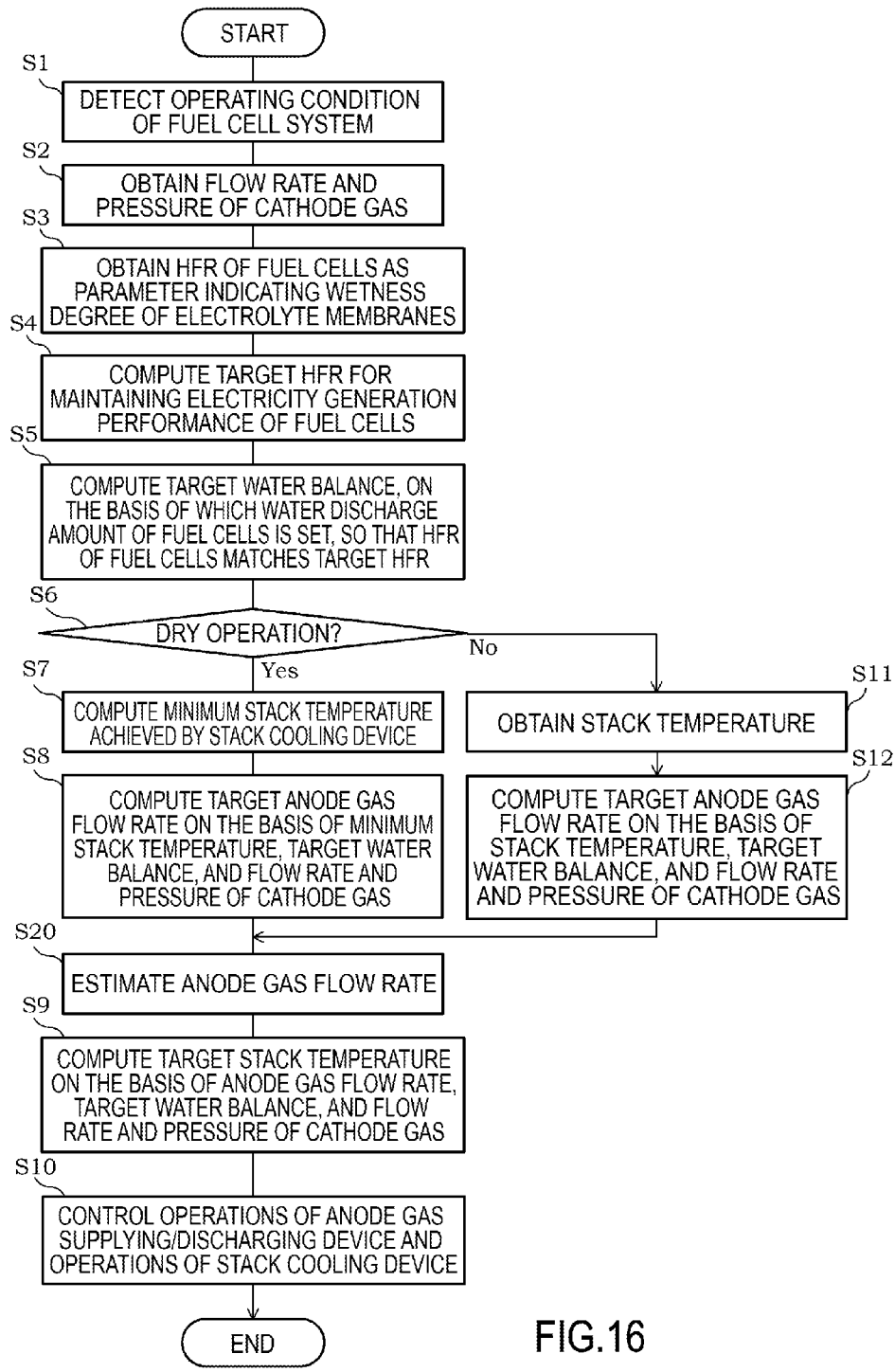
FIG. 16 is a flowchart showing an example of a control method for the fuel cell system according to the second embodiment.

FIG. 16 is a flowchart showing an example of a control method for the fuel cell system 100 according to the present embodiment.

In FIG. 16, the process of step S20 is added after the processes of steps S8 and S12. Therefore, only the process of step S20 will be described below.

In step S20, the anode gas flow rate estimation unit 240 estimates the flow rate of the anode gas circulated to the fuel cell stack 1 on the basis of the rotation speed of the anode circulation pump 36.

In the present embodiment, upon obtaining the rotation speed of the anode circulation pump 36, the anode gas flow rate estimation unit 240 calculates the anode gas flow rate corresponding to the obtained rotation speed with reference to the flow rate estimation map shown in FIG. 15. The anode gas flow rate estimation unit 240 converts the calculated anode gas flow rate $Q$ into the anode gas flow rate $Q_0$ at normal conditions in accordance with the expression (11).

Thereafter, in step S9, the target stack temperature computation unit 230 calculates the anode/cathode flow rate ratio $K_{ac}$ using the anode gas flow rate $Q_0$ instead of using the wet/dry-required anode gas flow rate $Q_{a\_rw}$ in the expression (8). The target stack temperature computation unit 230 calculates the target stack temperature Tt on the basis of the calculated anode/cathode flow rate ratio $K_{ac}$.

FIGS. 17A to 17D are time charts showing changes in the operating condition of the fuel cell system 100 according to the present embodiment.

Vertical axes in FIGS. 17A to 17D are the same as the vertical axes in FIGS. 12A to 12D, respectively. Horizontal axes in FIGS. 17A to 17D represent a common time axis.

In FIGS. 17A to 17D, solid lines indicate changes in the operating condition of the fuel cell system 100 according to the present embodiment, whereas dashed lines indicate changes in the operating condition of the fuel cell system 100 according to the first embodiment shown in FIGS. 12A to 12D.

Similarly to FIGS. 12A to 12D, at time t20, the target water balance changes from an upturn to a downturn, and the dry operation is started. At this time, the value output from the load-required anode gas flow rate computation unit 221 shown in FIG. 8 is larger than a predetermined lower limit of the wet/dry-required anode gas flow rate.

Figure 17:
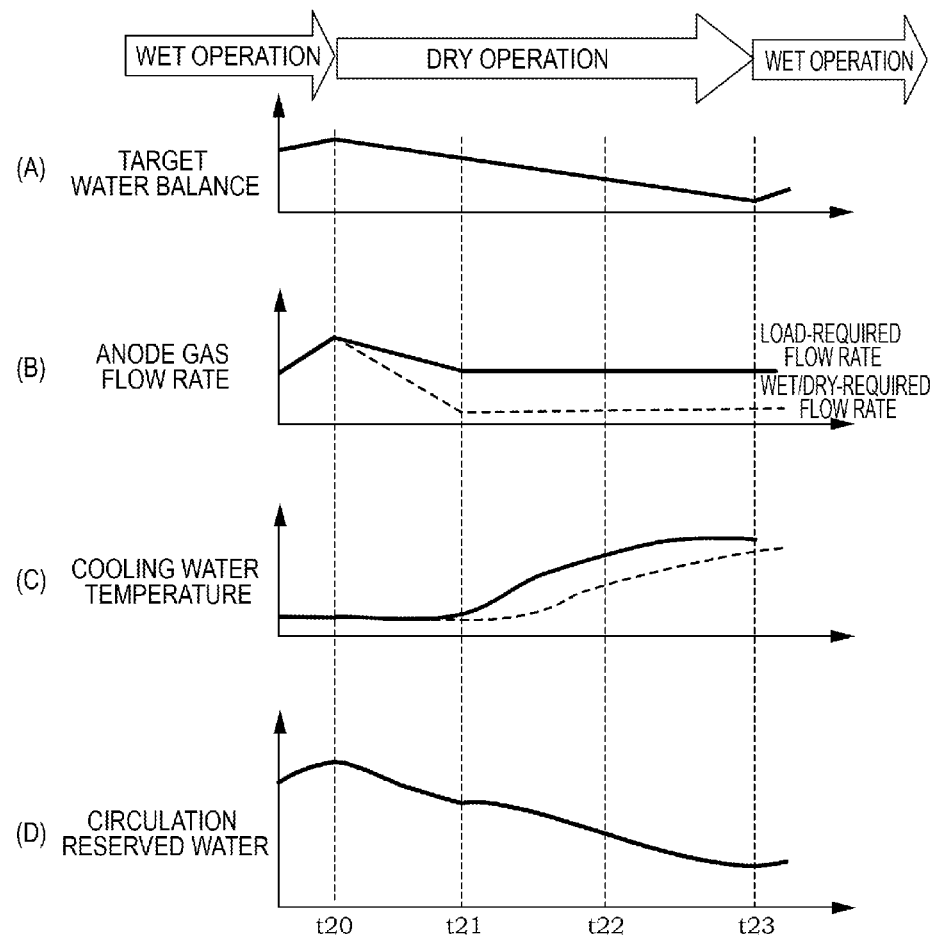
FIGS. 17A to 17D are time charts showing changes in the condition of the fuel cell system when a dry operation is executed.

Therefore, at time t21, the target anode gas flow rate is restricted due to the load-required flow rate as shown in FIG. 17B. This causes a large gap between the actual anode gas flow rate and the wet/dry-required anode gas flow rate.

In the first embodiment, as the wet/dry-required anode gas flow rate is input to the target stack temperature computation unit 230, the cooling water temperature does not increase as indicated by the dashed line in FIG. 17C even if the gap between the actual anode gas flow rate and the wet/dry-required anode gas flow rate becomes large.

In contrast, in the present embodiment, the anode gas flow rate estimation unit 240 estimates the anode gas flow rate on the basis of the rotation speed of the anode circulation pump 36, and outputs the estimated value to the target stack temperature computation unit 230.

Thus, the target stack temperature is computed using the estimated value of the anode gas flow rate. This makes it possible to increase the target stack temperature along with a reduction in the target water balance even if the reduction control for reducing the anode gas flow rate is restricted due to some kind of requirement.

Therefore, in a situation where a reduction in the anode gas flow rate is restricted as shown in FIG. 17B, the cooling water temperature increases along with a reduction in the target water balance as shown in FIG. 17C. As a result, the circulation reserved water decreases as shown in FIG. 17D, similarly to the first embodiment.

As described above, even if there is a gap between the actual anode gas flow rate and the wet/dry-required anode gas flow rate, the electricity generation control unit 202A can increase the stack temperature so as to reduce the target water balance in accordance with the actual anode gas flow rate. That is, even in a situation where the wetness degree of the electrolyte membranes 111 cannot be frilly adjusted by the reduction control for reducing the anode gas flow rate, the temperature increasing control for increasing the stack temperature is performed. Therefore, the dry operation can be supplemented by the temperature increasing control.

FIGS. 18A to 18D are flowcharts showing changes in the operating condition of the fuel cell system 100 when the target water balance decreases in a pulse-like manner.

Vertical axes in FIGS. 18A to 18D are the same as the vertical axes in FIGS. 17A to 17D, respectively. Horizontal axes in FIGS. 18A to 18D represent a common time axis.

Figure 18:
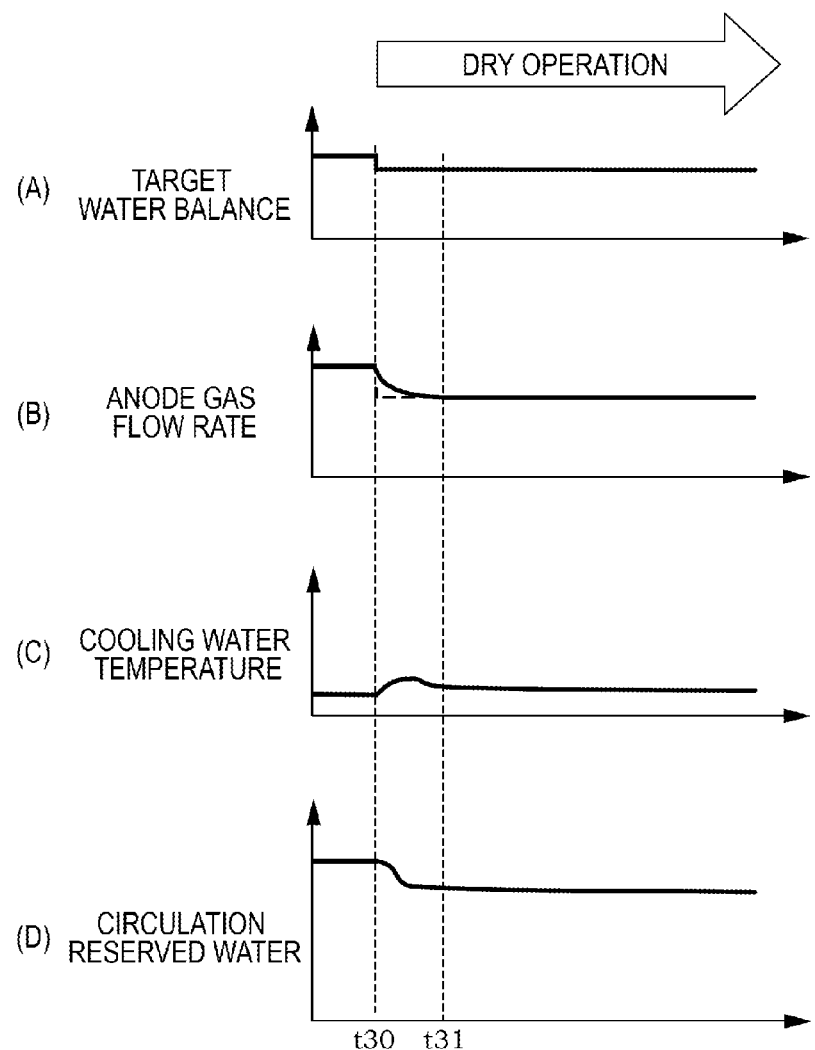
FIGS. 18A to 18D are time charts showing examples of changes in the condition of the fuel cell system in a dry operation for reducing a degree of wetness at transient time.

In FIG. 18B, a solid line indicates the anode gas flow rate, whereas a dashed line indicates the target anode gas flow rate. Note that even if the anode gas flow rate changes suddenly, the estimated value of the anode gas flow rate output from the anode gas flow rate estimation unit 240 is substantially the same as the actual value of the anode gas flow rate.

At time t30, the target water balance quickly decreases as shown in FIG. 18A. It is presumed that this situation occurs when, for example, the output required by the load device 5 becomes extremely high at the time of vehicle acceleration, and the target HFR accordingly decreases in a short amount of time as shown in FIG. 7.

The target anode gas flow rate computation unit 220 calculates the target anode gas flow rate that can achieve the target water balance as shown in FIG. 18B. On the other hand, reducing the anode gas flow rate takes long compared with the target value due to, for example, a delay in the response of the anode circulation pump 36.

Immediately after time t30, there is a large gap between the estimated value and the target value of the anode gas flow rate; thus, the dry control, which is performed using the anode circulation pump 36, is not sufficient. Therefore, the target stack temperature computation unit 230 increases the target stack temperature by a difference between the estimated value and the target value of the anode gas flow rate. This causes a transient increase in the cooling water temperature as shown in FIG. 18C, hence a transient increase in the circulation reserved water as shown in FIG. 18D.

As time passes since time t30, the anode gas flow rate approaches the target value, thereby reducing the difference between the estimated value and the target value of the anode gas flow rate. Accordingly, the target stack temperature computation unit 230 reduces the target stack temperature by the amount of the transient increase. As a result, as shown in FIG. 18C, the cooling water temperature that exhibited the transient increase decreases. This causes a reduction in the circulation reserved water as shown in FIG. 18D.

At time t31, the reduced anode gas flow rate reaches the target value as shown in FIG. 18B. Accordingly, the cooling water temperature decreases and enters a steady state as shown in FIG. 18C.

As described above, when the target water balance exhibits a transient decrease, a delay occurs in the reduction control that is performed using the anode circulation pump 36. Thus, the electricity generation control unit 202A performs the temperature increasing control for increasing the stack temperature in correspondence with the delay. That is, when executing the dry operation at transient time, the electricity generation control unit 202A reduces the anode gas flow rate, and also increases the cathode gas temperature so as to reduce a difference between the wetness degree of the electrolyte membranes 111 and the target value for maintaining the electricity generation performance.

In this way, when the amount of water in the electrolyte membranes 111 is promptly reduced, the temperature increasing control for increasing the cathode gas temperature is performed so as to supplement the reduction control for reducing the anode gas flow rate. Thus, the amount of water in the electrolyte membranes 111 can be reduced efficiently and quickly.

Furthermore, when the target water balance exhibits a transient decrease, the electricity generation control unit 202A reduces the stack temperature as the anode gas flow rate approaches the target value. Accordingly, the circulation reserved water decreases, thereby facilitating a decrease in the wetness degree of the electrolyte membranes 111. As a result, the thy operation can be efficiently executed.

FIGS. 19A to 19D are flowcharts showing changes in the operating condition of the fuel cell system 100 when the target water balance decreases by a large extent compared with FIGS. 18A to 18D.

At time t40, the target water balance quickly decreases similarly to FIG. 18A. Here, the target water balance decreases by a large extent compared with FIG. 18A, and thus the cooling water temperature also increases by a large extent as shown in FIG. 19C.

Figure 19:
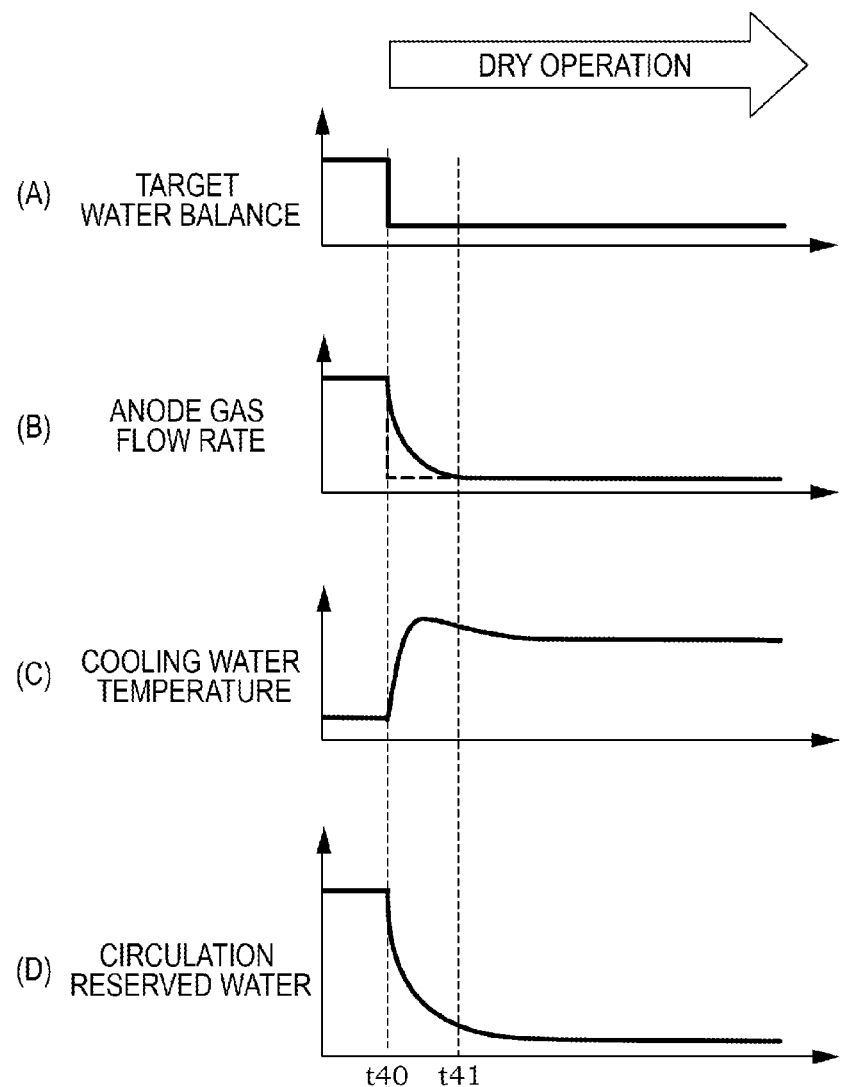
FIGS. 19A to 19D are time charts showing examples of changes in the condition of the fuel cell system with an increased amount of reduction at transient time.

Furthermore, as the target water balance decreases by a large extent, the target anode gas flow rate also decreases by a large extent as shown in FIG. 19A. Thus, along with a reduction in the anode gas flow rate, the amount of reduction in the circulation reserved water increases as shown in FIG. 19D.

Therefore, the present embodiment can increase the cooling water temperature while reducing the circulation reserved water, thereby quickly achieving the target water balance.

As described above, when the extent of the transient reduction in the target water balance is so large that the wetness degree of the electrolyte membranes 111 cannot be reduced simply by performing the reduction control for reducing the anode gas flow rate, the electricity generation control unit 202A starts the temperature increasing control for increasing the stack temperature before completion of the reduction control for reducing the anode gas flow rate. That is, the electricity generation control unit 202A increases the stack temperature before the anode gas flow rate reaches a lower limit determined by the wet/dry control.

Therefore, when the extent of reduction in the wetness degree of the electrolyte membranes 111 has exceeded a predetermined value, the electricity generation control unit 202A performs the temperature increasing control for increasing the cathode gas temperature in parallel with the reduction control for reducing the anode gas flow rate using the anode circulation pump 36. In this way, the dry operation can be efficiently executed while shifting to a state where the wetness degree of the electrolyte membranes 111 is easily reduced.

Note that the present embodiment has introduced an example in which the controller 200 estimates the anode gas flow rate. However, in place of the pressure sensor 37, a flow rate sensor may be provided in the anode gas supply passage 32 so as to be located downstream relative to the ejector 34, and a detection signal from the flow rate sensor may be input to the target stack temperature computation unit 230. In this way, the dry operation can be executed more accurately.

According to the second embodiment of the present invention, similarly to the first embodiment, the target anode gas flow rate computation unit 220 reduces the anode gas flow rate in the dry operation on the basis of a temperature lower than the temperature of the fuel cell 10 and the measured HFR that correlates with the wetness degree of the electrolyte membranes 111.

The present embodiment differs from the first embodiment in that the anode gas flow rate estimation unit 240 estimates the flow rate of the anode gas circulated to the fuel cell stack 1 on the basis of the rotation speed of the anode circulation pump 36 and the anode gas pressure detected by the pressure sensor 37. Using the estimated value of the anode gas flow rate in place of the wet/dry-required anode gas flow rate shown in FIG. 4, the target stack temperature computation unit 230 increases the cathode gas temperature so as to reduce a difference between the measured HFR and the target HFR.

Therefore, even if the anode gas flow rate is controlled by a flow rate that is based on a requirement different from the wet/dry-required anode gas flow rate, for example, by the load-required flow rate, the target stack temperature computation unit 230 can control the stack temperature on the basis of a value equivalent to the actual anode gas flow rate.

This makes it possible to increase the stack temperature in accordance with a difference between the estimated value of the anode gas flow rate and the target value for the wet/dry control according to the target water balance (the wet/dry-required anode gas flow rate) in the dry operation at transient time.

Thus, in the dry operation at transient time, the anode gas flow rate estimation unit 240 can cause the anode circulation pump 36 and the cooling water pump 42 to operate simultaneously in accordance with a difference between the estimated value and the target value of the anode gas flow rate by setting the estimated value of the anode gas flow rate, instead of the wet/dry-required anode gas flow rate, in the target stack temperature computation unit 230.

That is, in the dry operation at transient time, the anode gas flow rate estimation unit 240 composes a priority control unit that gives the same priority order to the operations of the anode circulation pump 36 and the operations of the cooling water pump 42. In this way, in the dry operation at transient time, there is no need to wait for the operations of the anode circulation pump 36, that is, the anode circulation pump 36 and the cooling water pump 42 can operate in parallel in accordance with a difference between the estimated value and the target value of the anode gas flow rate.

As such, the target stack temperature computation unit 230 can increase the stack temperature in accordance with the amount of reduction in the actual anode gas flow rate. Therefore, the dry operation can be efficiently executed and a period of time required for the dry operation can be shortened compared with the first embodiment.

The following describes an exemplary configuration of the impedance measuring device 6 according to the foregoing embodiments.

Figure 20:
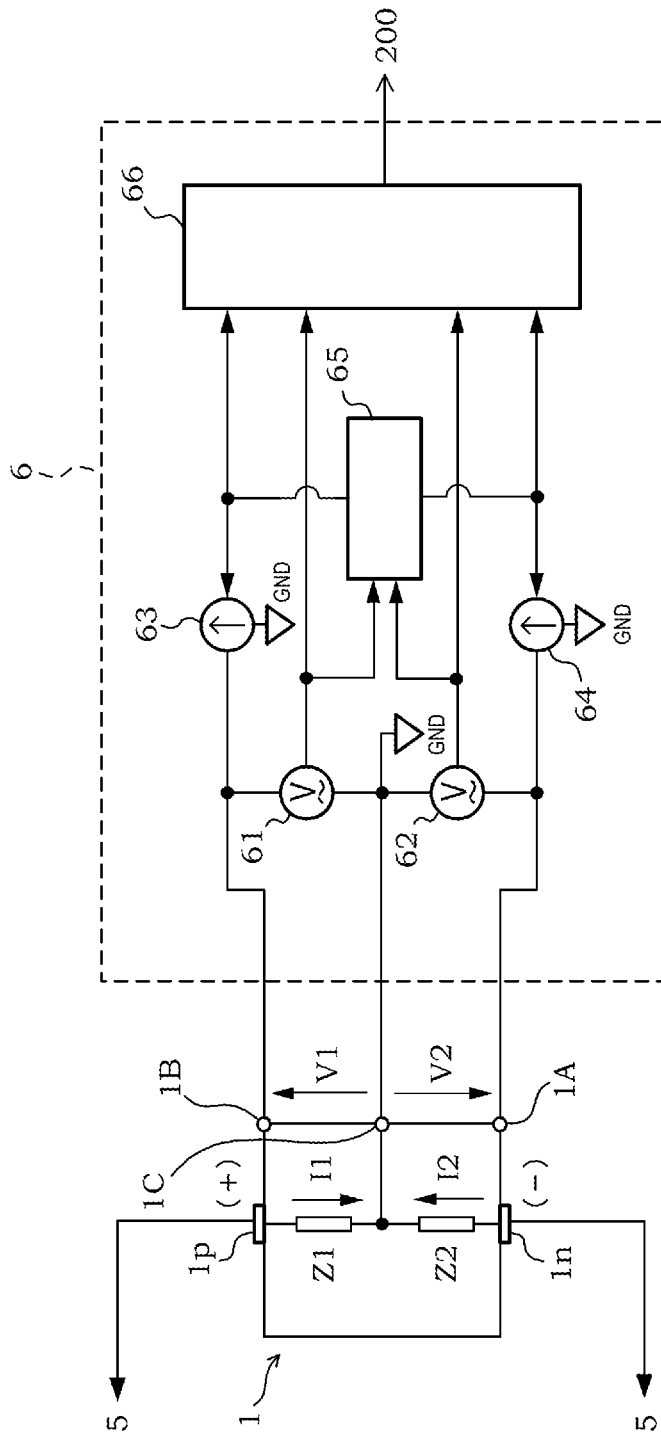
FIG. 20 shows an exemplary configuration of an impedance measuring device.

FIG. 20 is a block diagram showing an exemplary configuration of the impedance measuring device 6.

The impedance measuring device 6 is connected to a positive electrode terminal (cathode electrode side terminal) 1B, a negative electrode terminal (anode electrode side terminal) 1A, and an intermediate terminal 1C of the fuel cell stack 1. Note that a portion that is connected to the intermediate terminal 1C is grounded.

The impedance measuring device 6 includes a positive electrode side voltage measuring sensor 61 that measures a positive electrode side AC potential difference V1 between the positive electrode terminal 1B and the intermediate terminal 1C, and a negative electrode side voltage measuring sensor 62 that measures a negative electrode side AC potential difference V2 between the negative electrode terminal 1A and the intermediate terminal 1C.

The impedance measuring device 6 also includes a positive electrode side AC power supply unit 63 that applies an alternating current I1 to a circuit composed of the positive electrode terminal 1B and the intermediate terminal 1C, a negative electrode side AC power supply unit 64 that applies an alternating current I2 to a circuit composed of the negative electrode terminal 1A and the intermediate terminal 1C, a controller 65 that adjusts the amplitudes and phases of the alternating current I1 and the alternating current I2, and an impedance computation unit 66 that computes an internal impedance Z of the fuel cell stack 1 on the basis of the positive electrode side AC potential difference V1, the positive electrode side AC potential difference V2, the alternating current I1, and the alternating current I2.

The controller 65 adjusts the amplitudes and phases of the alternating current I1 and the alternating current I2 so that the positive electrode side AC potential difference V1 and the negative electrode side AC potential difference V2 become equal to each other.

Although not illustrated, the impedance computation unit 66 includes hardware components, such as an AD converter and a microcomputer chip, as well as software components, such as a program that calculates the impedance.

The impedance computation unit 66 calculates an internal impedance Z1 from the intermediate terminal 1C to the positive electrode terminal 1B by dividing the positive electrode side AC potential difference V1 by the alternating current I1, and calculates an internal impedance Z2 from the intermediate terminal 1C to the negative electrode terminal 1A by dividing the negative electrode side AC potential difference V2 by the alternating current I2. The impedance computation unit 66 then calculates the overall impedance Z of the fuel cell stack 1 by summing the internal impedance Z1 and the internal impedance Z2.

According to the present embodiment, the impedance measuring device 6 is connected to the fuel cell stack 1, and includes the AC power supply units 63, 64, the controller 65, and the impedance computation unit 66. The AC power supply units 63, 64 output the alternating currents I1, I2 to the fuel cell stack 1. The controller 65 serves as an AC adjustment unit that adjusts the alternating currents I1, I2 on the basis of the positive electrode side AC potential difference V1 and the negative electrode side AC potential difference V2. The positive electrode side AC potential difference V1 is a potential difference obtained by subtracting the potential at the intermediate portion 1C from the potential at the positive electrode side 1B of the fuel cell stack 1. The negative electrode side AC potential difference V2 is a potential difference obtained by subtracting the potential at the intermediate portion 1C from the potential at the negative electrode side 1A of the fuel cell stack 1. The impedance computation unit 66 computes the impedance Z of the fuel cell stack 1 on the basis of the adjusted alternating currents I1, I2, the positive electrode side AC potential difference V1, and the negative electrode side AC potential difference V2.

The controller 65 adjusts the amplitudes and phases of the alternating current I1 and the alternating current I2, which are respectively applied by the positive electrode side AC power supply unit 63 and the negative electrode side AC power supply unit 64, so that the positive electrode side AC potential difference V1 and the negative electrode side AC potential difference V2, which are respectively at the positive electrode side and the negative electrode side of the fuel cell stack 1, substantially match each other. Accordingly, the amplitude of the positive electrode side AC potential difference V1 and the amplitude of the negative electrode side AC potential difference V2 become equal to each other. Thus, the potential at the positive electrode terminal 1B and the potential at the negative electrode terminal 1A become substantially equal to each other (hereinafter referred to as potential equalization control). This prevents the alternating currents I1, I2, which are intended for impedance measurement, from flowing to the load device 5 and affecting the electricity generation by the fuel cell 10.

Furthermore, even when the fuel cell stack 1 is generating electric power, although the values of the positive electrode side AC potential difference V1 and the negative electrode side AC potential difference V2 increase because an AC potential intended for measurement is superimposed on a voltage generated by the electricity generation, the phases and amplitudes of the positive electrode side AC potential difference V1 and the negative electrode side AC potential difference V2 do not change. Therefore, impedance measurement can be performed with high precision similarly to when the fuel cell 10 is not generating electric power.

Furthermore, various changes can be made to circuit configurations and the like for measuring the impedance Z. For example, a predetermined current source may supply an alternating current to the fuel cell stack 1, and an output AC voltage may be measured. In this case, the impedance may be calculated on the basis of the supplied alternating current and the output AC voltage.

Although the embodiments of the present invention have been described thus far, the above embodiments merely illustrate a part of exemplary applications of the present invention, and specific configurations of the above embodiments are not intended to limit a technical scope of the present invention.

For example, in the above-described embodiment(s), the electricity generation control unit 202 computes the target anode gas flow rate and the target stack temperature using the measured values of the cathode gas flow rate and the cathode gas pressure. Alternatively, the target anode gas flow rate and the target stack temperature may be computed using average values of the cathode gas flow rate and the cathode gas pressure.

Furthermore, in the present embodiment(s), the membrane wet/dry state detection unit 201 computes the target water balance, and outputs the target water balance to both the target anode gas flow rate computation unit 220 and the target stack temperature computation unit 230. Alternatively, the membrane wet/dry state detection unit 201 may calculate the target discharge amount on the basis of the target water balance, and output the target discharge amount, in place of the target water balance, to both the target anode gas flow rate computation unit 220 and the target stack temperature computation unit 230.

Furthermore, although the priority control unit 201A is included in the membrane wet/dry state detection unit 201 in the present embodiment(s), the priority control unit 201A may be included in the electricity generation control unit 202.

Furthermore, although the cathode gas flow rate estimation unit 240 is included in the electricity generation control unit 202A in the present embodiment(s), the cathode gas flow rate estimation unit 240 may be included in the priority control unit 201A.

In another embodiment, the controller 200 may perform the wet/dry control as follows. The controller 200 determines whether to execute the dry operation on the basis of the target water balance (target discharge water amount). For example, the controller 200 determines whether the target water balance is smaller than a predetermined threshold (e.g., zero), and executes the dry operation if the target water balance is smaller than the predetermined threshold. In this dry operation, the controller 200 reduces the anode gas flow rate to a predetermined lower-limit flow rate by performing the reduction control. Thereafter, the controller 200 increases the flow rate of the cooling water to a predetermined upper-limit flow rate and increases the cathode gas temperature by performing the temperature increasing control. Even with such simple control, the dry operation can be quickly completed.

Note that the above-described embodiments can be combined as appropriate.

The invention claimed is:

1. A fuel cell system including a fuel supply unit that supplies a fuel to an electrolyte membrane of a fuel cell, an oxidant supply unit that supplies an oxidant to the electrolyte membrane, and an electricity generation control unit that controls electricity generation by the fuel cell by controlling supply of the oxidant by the oxidant supply unit and supply of the fuel by the fuel supply unit, the fuel cell system comprising:
   a wet/dry state detection unit configured to detect a wet/dry state of the electrolyte membrane;
   a flow rate adjustment unit configured to adjust a flow rate of the fuel supplied by the fuel supply unit to the fuel cell; and
   a temperature adjustment unit configured to adjust temperature of the oxidant supplied by the oxidant supply unit to the fuel cell, wherein
   when reducing an amount of water in the electrolyte membrane in accordance with a signal output from the wet/dry state detection unit, the electricity generation control unit is configured to reduce the flow rate of the fuel, and increases the temperature of the oxidant in accordance with the signal from the wet/dry state detection unit, compared with when increasing the amount of water in the electrolyte membrane.

2. A fuel cell system including a fuel supply unit that supplies a fuel to an electrolyte membrane of a fuel cell, an oxidant supply unit that supplies an oxidant to the electrolyte membrane, and an electricity generation control unit that controls electricity generation by the fuel cell by controlling supply of the oxidant by the oxidant supply unit and supply of the fuel by the fuel supply unit, the fuel cell system comprising:
- a wet/dry state detection unit configured to detect a wet/dry state of the electrolyte membrane;
- a flow rate adjustment unit configured to adjust a flow rate of the fuel supplied by the fuel supply unit to the fuel cell; and
- a temperature adjustment unit configured to adjust temperature of the oxidant supplied by the oxidant supply unit to the fuel cell, wherein the fuel cell includes
- a refrigerant flow passage configured to allow a refrigerant for cooling the fuel cell to flow therethrough,
- an oxidant flow passage configured to allow the oxidant to flow therethrough while facing one surface of a corresponding one of the electrolyte membrane, and
- a fuel flow passage configured to allow the fuel to flow therethrough, in a direction opposite to a direction of the oxidant flowing through the oxidant flow passage, while facing the other surface of the corresponding one of the electrolyte membrane, the temperature adjustment unit is configured to supply the refrigerant to the refrigerant flow passage, the fuel supply unit is configured to circulate the fuel discharged from one end of the fuel flow passage to the other end of the fuel flow passage, and when reducing an amount of water in the electrolyte membrane in accordance with a signal output from the wet/dry state detection unit, the electricity generation control unit is configured to reduce the flow rate of a fuel circulated to the fuel flow passages, and increase the temperature of the oxidant in accordance with the signal from the wet/dry state detection unit, compared with when increasing the amount of water in the electrolyte membrane.

3. The fuel cell system according to claim 1, wherein
when reducing the amount of water in the electrolyte membrane, the electricity generation control unit is configured to perform control for reducing the flow rate of the fuel using the flow rate adjustment unit in priority to control for increasing the temperature of the oxidant using the temperature adjustment unit.

4. The fuel cell system according to claim 1, wherein
when reducing the amount of water in the electrolyte membrane, the electricity generation control unit is configured to reduce the flow rate of the fuel, and also increases the temperature of the oxidant in accordance with the signal from the wet/dry state detection unit so as to reduce a difference between a wetness degree of the electrolyte membrane and a target value thereof.

5. The fuel cell system according to claim 4, wherein
the temperature adjustment unit includes a cooling device configured to supply a refrigerant to the fuel cell,
the electricity generation control unit includes
- a priority control unit configured to set an order of control over operation of the temperature adjustment unit and operation of the flow rate adjustment unit,
- a flow rate computation unit configured to reduce the flow rate of the fuel supplied to the fuel cell on the basis of temperature of the fuel cell and the wetness degree of the electrolyte membrane, and
- a temperature computation unit configured to control the temperature of the fuel cell on the basis of the flow rate of the fuel and the wetness degree of the electrolyte membrane, and when a dry operation for reducing the amount of water in the electrolyte membrane is executed, the priority control unit sets a temperature at the time of a wet operation as the temperature of the fuel cell in the flow rate computation unit, the temperature at the time of the wet operation being lower than the temperature of the fuel cell.

6. The fuel cell system according to claim 5, wherein
a lower limit of a range where the cooling device is able to adjust the temperature of the fuel cell is set as the temperature at the time of the wet operation.

7. The fuel cell system according to claim 6, wherein
when the dry operation is executed, the flow rate computation unit makes a reduction speed high compared with when the temperature of the fuel cell is used in place of the temperature at the time of the wet operation, the reduction speed being a speed of reduction in the flow rate of the fuel supplied to the fuel cell, and
the temperature computation unit reduces the temperature of the fuel cell as the flow rate of the fuel supplied to the fuel cell decreases, and increases the temperature of the fuel cell as the wetness degree of the electrolyte membrane increases.

8. The fuel cell system according to claim 1, wherein
the fuel supply unit includes
- a circulation passage configured to circulate a fuel discharged from the fuel cell back to the fuel cell, and
- a circulation pump provided in the circulation passage so as to adjust a circulation flow rate of a fuel circulated to the fuel cell, and when reducing the amount of water in the electrolyte membrane, the electricity generation control unit is configured to reduce an amount of water contained in the fuel circulated to the fuel cell via the circulation passage by reducing the circulation flow rate of the fuel.

9. The fuel cell system according to claim 1, wherein
the fuel cell includes
- a refrigerant flow passage configured to allow a refrigerant for cooling the fuel cell to flow therethrough,
- an oxidant flow passage configured to allow the oxidant to flow therethrough while facing one surface of a corresponding one of the electrolyte membrane, and
- a fuel flow passage configured to allow a fuel to flow therethrough, in a direction opposite to a direction of the oxidant flowing through the oxidant flow passage, while facing the other surface of the corresponding one of the electrolyte membrane, the temperature adjustment unit is configured to supply the refrigerant to the refrigerant flow passage, and the fuel supply unit is configured to circulate a fuel discharged from one end of the fuel flow passage to the other end of the fuel flow passage.

10. The fuel cell system according to claim 1, wherein
the wet/dry state detection unit is configured to detect an impedance of the fuel cell and outputs the impedance as a signal related to the wetness degree of the electrolyte membrane to the electricity generation control unit.

11. The fuel cell system according to claim 10, wherein
the fuel cell is composed of a laminated battery,
the wet/dry state detection unit includes a measuring device configured to measure an impedance of the laminated battery, and the measuring device includes
- an AC power supply unit connected to the laminated battery and configured to output an alternating current to the laminated battery,
- an AC adjustment unit configured to adjust the alternating current on the basis of a positive electrode side AC potential difference and a negative electrode side AC potential difference, the positive electrode side AC potential difference being a potential difference obtained by subtracting a potential at an intermediate portion of the laminated battery from a potential at a positive electrode side of the laminated battery, the negative electrode side AC potential difference being a potential difference obtained by subtracting the potential at the intermediate portion from a potential at a negative electrode side of the fuel cell, and
- a computation unit configured to compute the impedance of the fuel cell on the basis of the adjusted alternating current, the positive electrode side AC potential difference, and the negative electrode side AC potential difference.

12. A control method for a fuel cell system including a fuel supply unit for supplying a fuel to electrolyte membrane of fuel cell, an oxidant supply unit for supplying an oxidant to the electrolyte membrane, and an electricity generation control unit for controlling electricity generation by the fuel cell by controlling supply of the oxidant by the oxidant supply unit and supply of the fuel by the fuel supply unit, the control method comprising:
- a wet/dry state detection step of detecting a wet/dry state of the electrolyte membrane;
- a flow rate adjustment step of adjusting a flow rate of the fuel supplied by the fuel supply unit to the fuel cell;
- a temperature adjustment step of adjusting temperature of the oxidant supplied by the oxidant supply unit to the fuel cell, and
- an electricity generation control step of, when reducing an amount of water in the electrolyte membrane in accordance with a signal related to the wet/dry state of the electrolyte membrane, reducing the flow rate of the fuel, and increasing the temperature of the oxidant in accordance with the signal indicating the wet/dry state of the electrolyte membrane, compared with when increasing the amount of water in the electrolyte membrane.

* * * * *